(12) United States Patent
Schmidt

(10) Patent No.: US 8,898,576 B2
(45) Date of Patent: Nov. 25, 2014

(54) PRODUCT DATA MANAGEMENT AND WORKFLOW SYSTEMS AND METHODS

(75) Inventor: Christian Schmidt, Castrop-Rauxel (DE)

(73) Assignee: Verizon Deutschland GmbH, Frankfurt am Main (DE)

( * ) Notice: Subject to any disclaimer, the term of this patent is extended or adjusted under 35 U.S.C. 154(b) by 788 days.

(21) Appl. No.: 12/433,722

(22) Filed: Apr. 30, 2009

(65) Prior Publication Data
US 2010/0281426 A1    Nov. 4, 2010

(51) Int. Cl.
*G06F 3/00* (2006.01)
*G06F 17/30* (2006.01)

(52) U.S. Cl.
CPC ............... *G06F 17/30551* (2013.01)
USPC .......... 715/751; 715/758; 715/202; 706/50

(58) Field of Classification Search
USPC .............. 715/714, 715, 751, 202; 706/50
See application file for complete search history.

(56) References Cited

U.S. PATENT DOCUMENTS

| | | | |
|---|---|---|---|
| 7,792,888 B2 * | 9/2010 | Lee et al. ................. | 707/948 |
| 7,996,251 B2 * | 8/2011 | Kannan et al. ............ | 705/7.13 |
| 8,037,066 B2 * | 10/2011 | Majko ....................... | 707/734 |
| 2008/0271012 A1 * | 10/2008 | Eykholt ..................... | 717/174 |
| 2009/0112712 A1 * | 4/2009 | Milone ...................... | 705/14 |
| 2010/0088379 A1 * | 4/2010 | Borenstein et al. ........ | 709/206 |

OTHER PUBLICATIONS

Yahoo! (hereafter Yahoo), Yahoo! Answers, (2007) http://web.archive.org/web/20070218045840/http://answers.yahoo.com/info/faq.*
DataMumen, Delete Outlook Emails and Objects by Mistake (Nov. 9, 2007). http://www.datanumen.com/aor/problems/outlook-deleted.htm.*
Xiaoqing Zhou (hereinafter Zhou), Hide Post Mod. http://web.archive.org/web/20080220030806/http://custom.simplemachines.org/mods/index.php?mod=228.*
Interspire, Interspire Knowledge Manager, 3 pages, http://www.interspire.com, as accessed on Apr. 29, 2009.

* cited by examiner

*Primary Examiner* — Nicholas Augustine
*Assistant Examiner* — Di Xiao

(57) ABSTRACT

An exemplary method comprises maintaining product data in a computer-readable data store, the product data including a data entry comprising a question and an answer about a product, setting a lifetime date for the data entry, publishing the question and the answer about the product for access by at least one user, and, in response to the lifetime date being reached, automatically hiding the question and the answer about the product from access by the at least one user and designating the data entry for a lifetime review. In certain embodiments, the method further comprises providing, for display, data representative of a graphical user interface configured to facilitate the lifetime review of the data entry by a user, receiving data representative of a renewal of the data entry, and updating the lifetime date for the data entry based on the data representative of the renewal of the data entry.

26 Claims, 17 Drawing Sheets

| Question 405 | Answer 410 | Category 415 | Sub-category 420 | Keywords 425 | User Data 430 | Workflow Status 435 | Related Data 440 | Lifetime Date 445 |

Region Filter ~802
[all regions ▼] ~806

Product Categories

⊞ Cross-Product Topics
⊞ Data Networking Srvcs
⊟ ATM and Frame Relay
    INTL – ATM
    INTL – Frame Ry
    US – LD ATM
    US – LD Frame Ry
    US – ILEC ATM
    US – ILEC Frame Ry
⊞ Mobility Solutions
⊞ Internet Services
⊞ INTL – IT Solutions
⊟ INTL – Managed Net...
    Mngd. Srvcs Complete
    ⌐ ‾ ‾ ‾ ‾ ‾ ‾ ‾ ‾ ¬
    | Mngd. WAN | ~902
    Mngd. LAN
    Mngd. IP PBX
    Mngd. Wireless LAN
    RACER
    Mngd. WAN Optimiz.
    IP VPN Remote Acc.
⊞ INTL – Mngd. Security
⊞ Voice Services 804 ~ [Search for keywords (e.g., key1 key2 ...) ▲]

INTL – Managed LAN

International – Available as an extension of Managed Services Complete, Managed LAN extends the VZB MNS demarc to the Access Port on the customer premise LAN switches. This category does NOT include US services.
906 ↙ 908 ~ [Toggle subscription status]  ☐ Email Subscription       [Ask New Question]

Order by [date] [ABC]

⊞ Availability
⊞ CPE
⊞ Collateral
⊞ Contracting
» What is the standard contract term for Managed LAN?         [Show/Hide entry]
» Where can I find the Service Order Form for Managed LAN?    [Show/Hide entry]
» Which documents do I need to complete to order the
Managed LAN service?                                          [Show/Hide entry]
                                                                              ~912
⊞ Customer Benefits
⊞ Pricing
⊞ Product Features
⊞ Reporting + Monitoring
⊞ Service Level Agreement (SLA) ←
                                 ~910

| Region Filter | | | | |
|---|---|---|---|---|
| all regions ▼ | | | 804 — Search for keywords (e.g., key1 key2 …) ▲ | |
| Product Categories | Category | Question | Answer | Extend Lifetime | Action |
| ⊞ Billing & Billing Syst. | Managed IT Services | What is the post-sale customer service process for customers who experience problems with the service? | Customers will need to call the support desk and… | 24-May-09 ▼ 1306 | Edit Del. 1310 1308 |
| ⊞ Cross-Product Topics | | | | | |
| ⊞ Complex Sol. Devel. | | | | | |
| ⊞ Conferencing | | | | | |
| ⊞ Global CPE Resale | IT Solutions | In a Standard Data Center is the price for a 19" rack the same as a cabinet? | Yes, this is correct. | 30-May-09 ▼ | Edit Del. |
| ⊞ Customer Enable. | | | | | |
| ⊞ Data Networking | | | | | |
| ⊞ Internet Services | INTL – Data Center Colocation | Where can I find information about our Colocation sites in Canada? | Robert, I'll send you an e-mail directly. Regarding… | 22-June-09 ▼ | Edit Del. |
| ⊞ IP Comms. (VoIP) | | | | | |
| ⊞ IT Solutions | | | | | |
| ⊞ INTL – Mngd Network | Managed Apps. | Is there a product Managed SMTP server? I have a customer who requested this with Managed FW, antivirus-antispam, and remote access. | Yes, there is a service called Hosted Messaging which… | 30-June-09 ▼ | Edit Del. |
| Quick Stats | | | | | |
| To be answered     69 | | | | | |
| To be approved      7 | Managed IT Services | Can we provide a managed vendor service of UPS in the customer's premises in the US? | We no longer provide managed hosting service in… | 08-July-09 ▼ | Edit Del. |
| Final, unpublished 11 | | | | | |
| Out of date          653 | | | | | |
| Expires soon       444 | | | | | |
| New comments     69 | | | | | |
| Avg. Time to Answer | | | | | |
| Your categ.    0.39 days | | | | | |
| All categories 1.61 days | | | | | |

Fig. 13

Region Filter 802  
all regions

804 — Search for keywords (e.g., key1 key2 ...)

| User Home | User Profile | User Questions | User Subscriptions | User Statistics |

1404

Question Statistics

Last 6 Months ∨  Just my Categories ∨  Apply

1406

| Category | Questions | | Time to answer (days) | | | % answered in | | | |
|---|---|---|---|---|---|---|---|---|---|
| | Asked & answ. | to be answer | Min | Avg | Max | 24 hrs | 72 hrs | 5 days | >5 days |
| US Internet Ded., Mngd | 64 — 1412 | 2 — 1410 | 0 | 1.42 | 12.06 | 69% | 81% | 92% | 8% |
| Site Usage FAQ | 3 | 0 | 0 | 0.17 | 0.5 | 100% | 100% | 100% | 0% |
| Cross-Product Topics | 4 | 0 | 0.01 | 1.87 | 6.99 | 75% | 75% | 75% | 25% |
| Total: | 71 | 2 | 0 | 1.39 | 12.06 | 70% | 82% | 92% | 8% |

To view detailed statistics of questions by keyword, please click on a number above in the "asked & answered" column.

Category Statistics

Just my Categories ∨  Apply

1408

| Category | Publish | to be apprvd | final-unpub | out of date | expiring | new comm. |
|---|---|---|---|---|---|---|
| US Internet Ded., Mngd | 201 | 0 | 0 | 1 | 14 | 0 |
| Glossary | 98 | 0 | 0 | 0 | 0 | 0 |
| Site Usage FAQ | 20 | 0 | 0 | 0 | 0 | 0 |
| Cross-Product Topics | 12 | 0 | 0 | 1 | 0 | 0 |
| Total: | 331 | 2 | 0 | 0 | 14 | 0 |

To view a list of questions in a specific workflow status, please click on a number in a corresponding column above.

PRODUCT DATA MANAGEMENT AND WORKFLOW SYSTEMS AND METHODS

BACKGROUND INFORMATION

Enterprises, such as large business organizations, are commonly faced with challenges related to maintaining and managing information associated with products developed and provided by the enterprises. Such challenges may prove to be especially difficult when significant amounts of product data are being managed, when the people associated with the products have different needs and/or are located at geographically diverse locations, when different people are responsible for different data, when different people are allowed to update data, and/or when products change over time.

Data management tools have been developed to address such challenges related to managing electronic product data. However, existing data management tools have limitations. For example, certain conventional data management tools do not adequately manage aging product data and/or do not provide certain information about the product data. As another example, certain conventional product data management tools are aimed at providing information to external customers of an enterprise and do not provide adequate internal support to product teams within the enterprise.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 4 illustrates elements of an exemplary data entry that may be stored in a data store.

FIGS. 8-16 illustrate graphical user interfaces having exemplary product data management views displayed therein.

DETAILED DESCRIPTION OF PREFERRED EMBODIMENTS

Figure 1:
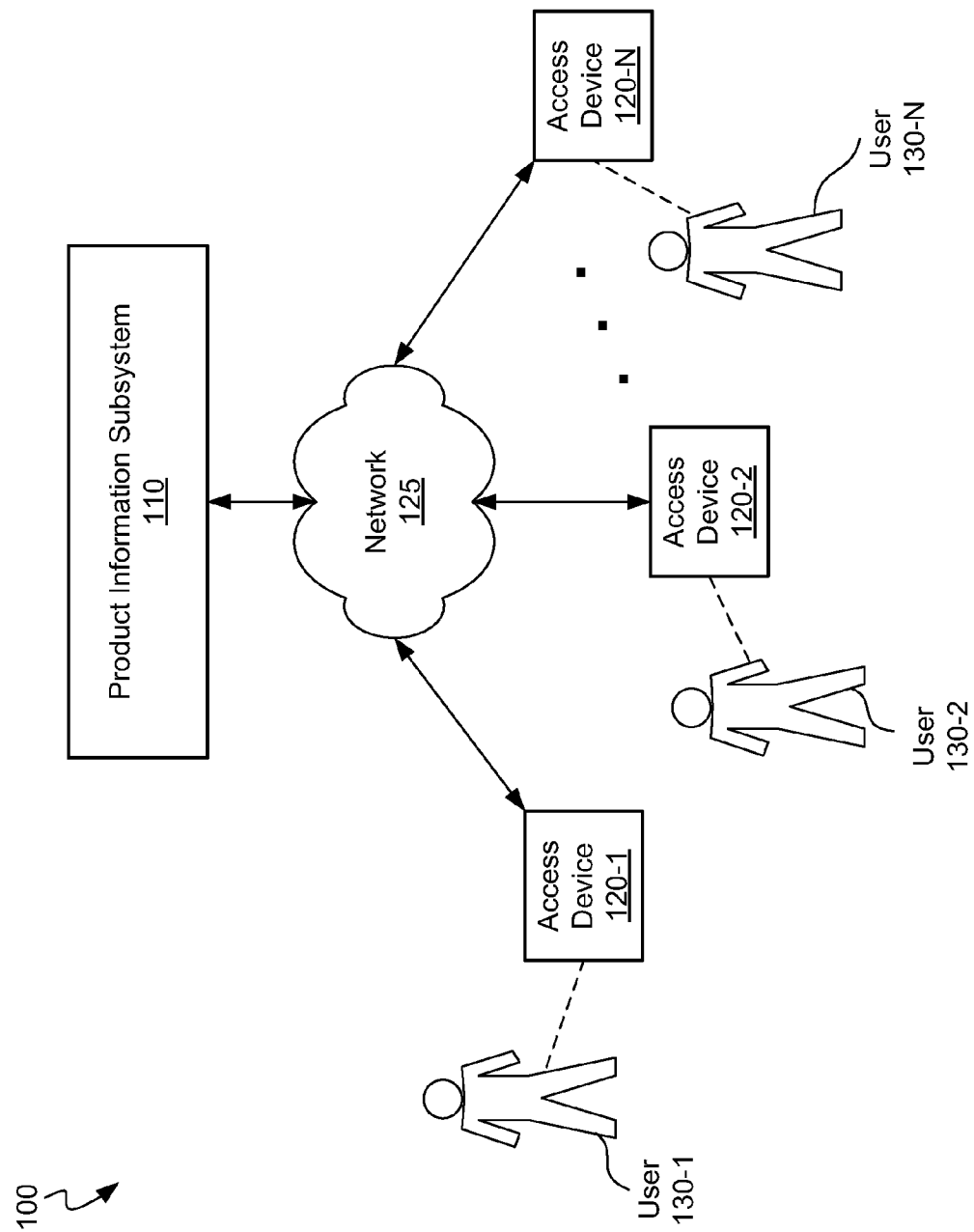
FIG. 1 illustrates an exemplary product data management and workflow system.

Exemplary product data management and workflow systems and methods are described herein. The exemplary systems and methods described herein may maintain product data in one or more data stores (e.g., a database). In certain embodiments, the product data may include data representative of questions and answers about products. For example, the product data may comprise a plurality of product data entries, and each product data entry may include or otherwise be associated with a question about a product and an answer to the question.

As described in detail further below, in certain embodiments, a question may be received from a user and processed by the exemplary systems and methods described herein in accordance with a predefined workflow heuristic. As is also described in detail further below, in certain embodiments, an answer to the question may be received from another user, approved, and published together with the question for user access by the exemplary systems and methods described herein and in accordance with the predefined workflow heuristic.

In certain embodiments, the exemplary systems and methods described herein may set a lifetime date for a product data entry having a question and an answer about a product, publish the question and answer about the product for user access, and, in response to the lifetime date being reached, automatically hide the question and answer about the product from user access and designate the entry for a lifetime review. In certain embodiments, the exemplary systems and methods described herein may provide data representative of a graphical user interface for display and configured to facilitate the lifetime review of the product data entry by a user, receive data representative of a renewal of the product data entry, and update the lifetime date for the product data entry based on the data representative of the renewal of the product data entry. The renewed product data entry may be published again for user access.

In certain embodiments, the exemplary systems and methods described herein may automatically determine a length of time to provide an answer to a question about a product. The length of time may include a period of time from receipt of data representative of the question until data representative of an answer to the question is received or published for user access. The length of time to provide an answer may be utilized to calculate a time-to-answer statistic, which may be made available to one or more users.

These and other operations and features of the exemplary systems and methods described herein may provide robust tools for managing and utilizing product data, as well as other data related to the product data (e.g., time-to-answer statistics). In certain embodiments, for example, the exemplary systems and methods described herein may provide internal support to one or more product teams associated with products provided by an enterprise. For instance, a product team may be able to utilize the exemplary systems and methods described herein to improve products provided by the enterprise, such as by using statistics provided by the exemplary systems and methods to identify a product for which inadequate product literature is being provided to external customers. As another example, in certain embodiments, the exemplary systems and methods described herein may keep published product data up-to-date, such as by initiating regular internal lifetime reviews of product data. Exemplary embodiments, features, functions, and graphical user interfaces of exemplary product data management and workflow systems and methods will now be described in more detail with reference to the accompanying drawings.

FIG. 1 illustrates an exemplary product data management and workflow system 100 (or simply "system 100"). As shown in FIG. 1, system 100 may include a product data management subsystem 110 selectively and communicatively connected to a plurality of access devices 120 (e.g., access devices 120-1 through 120-N) by way of a network 125.

The access devices 120 and the product data management subsystem 110 may communicate over network 125 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, fiber optic communication technologies, and other suitable communications networks and technologies. In other embodiments, one or more of the access devices 120 may communicate directly with product data management subsystem 110.

Network 125 may include one or more networks, including, but not limited to, wireless networks, mobile telephone networks (e.g., cellular telephone networks), closed media networks, open media networks, closed communication networks, open communication networks, satellite networks, navigation networks, broadband networks, narrowband networks, voice communication networks (e.g., the PSTN and/or VoIP networks), the Internet, wide area networks, local area networks, public networks, private networks, and any other networks capable of carrying data and/or communications signals between access devices 120 and product data management subsystem 110.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices and/or computer operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a computer-readable medium (e.g., from a memory, etc.), and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Hence, in certain embodiments, system 100 may include or be implemented on one or more computing devices configured to perform one or more of the data management and workflow process described herein. For example, product data management subsystem 110 may include or be implemented on one or more computing devices (e.g., one or more server devices) configured to perform one or more of the data management and workflow processes described herein.

Access devices 120 may be associated with one or more users. As an example, FIG. 1 shows users 130-1, 130-2, and 130-N (collectively "users 130") as being associated with access devices 120-1, 120-2, and 120-N, respectively. The exemplary users 130 and their particular associations with access devices 120 are shown for illustrative purposes. Other user associations with access devices 120 may be defined in system 100. As described further below, users 130 may be assigned one or more user roles in system 100, which may be used for processing product data in accordance with a predefined workflow heuristic.

Access device 120 may include any device configured to perform one or more of the access device operations described herein, including communicating with product data management subsystem 110 by way of network 125. Access device 120 may include, but is not limited to, a computing device, a communication device, a personal digital assistant, and/or any other device configured to perform one or more of the access device operations described herein.

Figure 2:
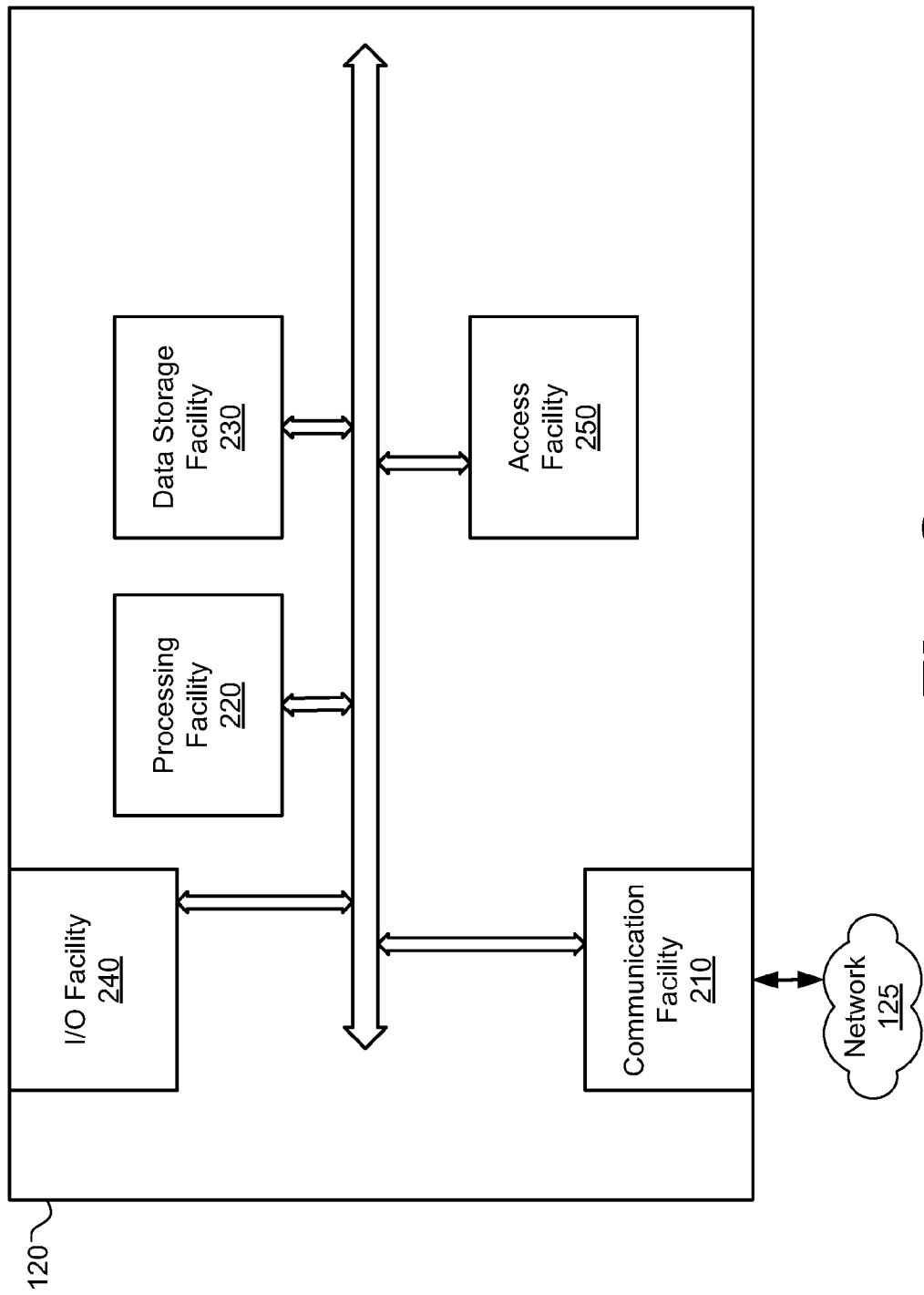
FIG. 2 illustrates exemplary components of an access device.

FIG. 2 illustrates components of an exemplary access device 120. As shown in FIG. 2, access device 120 may include a communication facility 210, processing facility 220, data storage facility 230, input/output ("I/O") facility 240, and access facility 250 communicatively connected to one another. The facilities 210-250 may be communicatively connected using any suitable technologies. Each of the facilities 210-250 may be implemented as hardware, computing instructions (e.g., software) tangibly embodied on a computer-readable medium, or a combination of hardware and computing instructions configured to perform one or more of the processes described herein.

Communication facility 210 may be configured to send and receive communications over network 125, including sending and receiving any data described herein to/from product data management subsystem 110. Communication facility 210 may include any device, logic, and/or other technologies suitable for transmitting and receiving data and other communications. The communication facility 210 may be configured to interface with any suitable communication media, protocols, formats, platforms, and networks, including any of those mentioned herein.

Processing facility 220 may be configured to control operations of one or more components of the access device 120. Processing facility 220 may execute and/or direct execution of operations in accordance with computer-executable instructions such as may be stored in data storage facility 230 or other computer-readable medium. As an example, processing facility 220 may be configured to process communications, including demodulating, decoding, and parsing received communications, and encoding and modulating communications for transmission to product data management subsystem 110.

Data storage facility 230 may include one or more data storage media, devices, or configurations and may employ any type, form, and combination of storage media. For example, the data storage facility 230 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the data storage facility 230.

I/O facility 240 may be configured to receive user input and provide user output and may include any hardware, firmware, software, or combination thereof supportive of input and output capabilities. For example, I/O facility 240 may include one or more devices for capturing user input, including, but not limited to, a microphone, keyboard or keypad, touch screen component, and receiver (e.g., an RF or infrared receiver).

I/O facility 240 may include one or more components for presenting data and/or content for experiencing by a user 130, including, but not limited to, a graphics engine, a display, display drivers, one or more audio speakers, and one or more audio drivers. Accordingly, I/O facility 240 may present data and/or content for experiencing by the user 130.

Access facility 250 may include any hardware, computing instructions (e.g., software), or combination thereof configured to support interaction between access device 120 and product data management subsystem 110, including access device 120 accessing data provided by product data management subsystem 110 over network 125 and access device 120 receiving and sending user input to product data management subsystem 110. Access facility 250 may further support access device 120 processing data received from product data management subsystem 110 over network 125, including processing received data to facilitate display of one or more graphical user interfaces ("GUIs") and/or graphical data received from product data management subsystem 110. In certain embodiments, access facility 250 may be implemented as a software program (e.g., a web browser) in access device 120.

Figure 3:
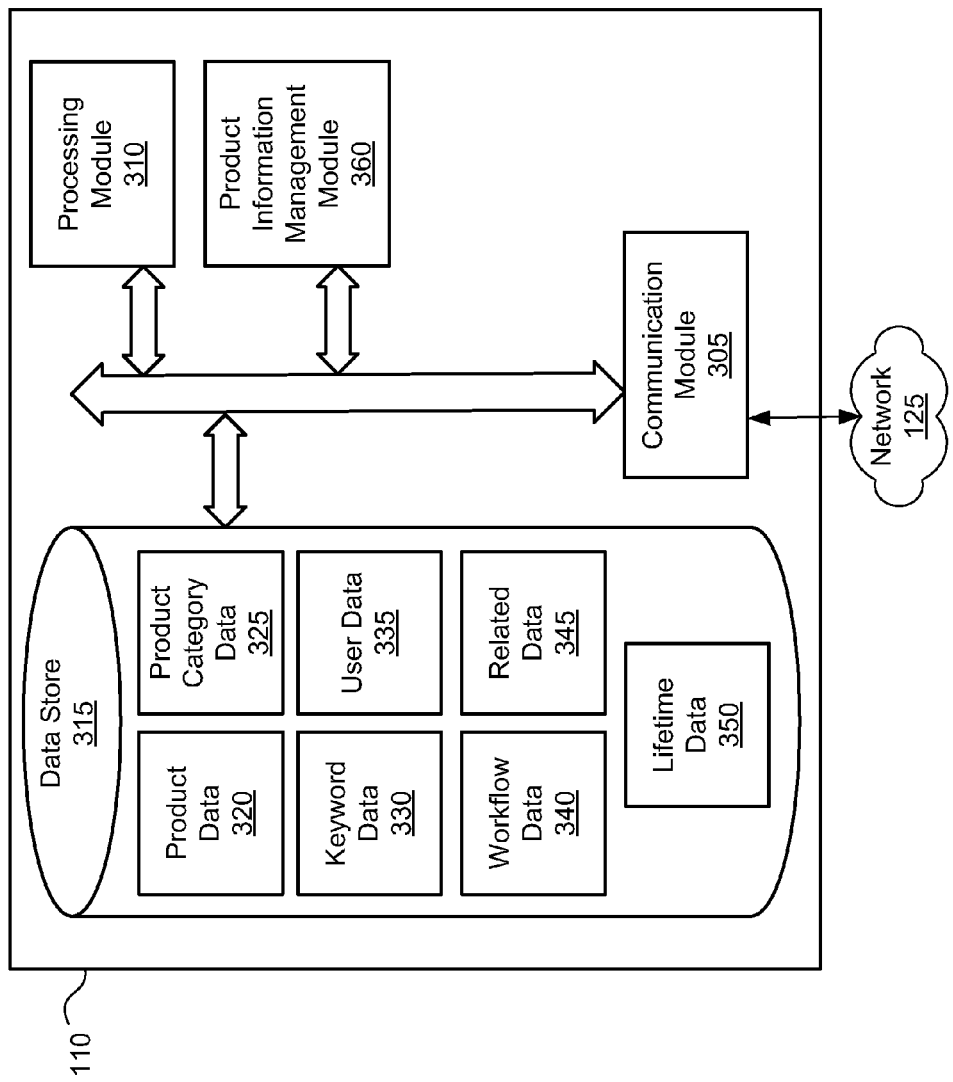
FIG. 3 illustrates exemplary components of a product data management subsystem.

Accordingly, access device 120 may provide a user 130 with access to data, GUIs, and/or one or more functions (e.g., web-based tools) provided by product data management subsystem 110. FIG. 3 illustrates components of an exemplary product data management subsystem 110. The components of product data management subsystem 110 may include or be implemented as hardware, computing instructions (e.g., software) embodied on a computer-readable medium, or a combination thereof. In certain embodiments, for example, one or more components of product data management subsystem 110 may include or be implemented on one or more server devices (e.g., an application server, messaging server, and/or web server) configured to communicate over network 125. While an exemplary product data management subsystem 110 is shown in FIG. 3, the exemplary components illustrated in FIG. 3 are not intended to be limiting. Indeed, additional or alternative components and/or implementations may be used.

As shown in FIG. 3, product data management subsystem 110 may include a communication module 305, which may be configured to transmit and receive communications over network 125, including receiving data from and providing data to access devices 120 by way of network 125. The communication module 305 may include and/or support any suitable communication platforms and technologies for communicating with and transporting data and other communications to/from access devices 120 over network 125. Communication module 305 may be configured to support a variety of communication platforms, protocols, and formats such that product data management subsystem 110 can receive data from and provide data to access devices 120 and/or other access devices of a variety of platforms (e.g., a mobile telephone service platform, a subscriber television service platform, a web-based platform, a Wi-Fi platform, etc.) and using a variety of communications technologies. Accordingly, product data management subsystem 110 can support a multi-platform system in which data and communications can be received from and provided to diverse platforms.

Product data management subsystem 110 may include a processing module 310 configured to control operations of components of the access device 120. Processing module 310 may execute and/or direct execution of operations in accordance with computer-executable instructions stored to a computer-readable medium such as a data store 315. As an example, processing module 310 may be configured to process (e.g., encode, decode, modulate, and/or demodulate) data and communications received from or to be transmitted to access devices 120 over network 125. As another example, processing module 310 may be configured to perform data management operations for storing data to data store 315 and for identifying, indexing, searching, retrieving, modifying, annotating, and/or deleting data stored in data store 315.

Data store 315 may include one or more computer-readable data storage media, devices, or configurations and may employ any type, form, and combination of storage media. For example, the data store 315 (also referred to as "computer-readable data store 315") may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

Data store 315 may store any suitable type or form of electronic data, including electronic data organized in one or more databases (e.g., a relational database). As shown in FIG. 3, data store 315 may include product data 320, product category data 325, keyword data 330, user data 335, workflow data 340, related data 345, and lifetime data 350.

Product data 320 may include data representative of one or more products, which as used herein may include any product and/or service provided to one or more users (e.g., customers such as subscribers to one or more products or services). For example, a product may include any telecommunications and/or related product and/or service. Examples of such products may include, without limitation, PSTN services, PSTN lines, virtual private networks, managed LANs, managed WANs, managed PBXs, VoIP services, network access services, DSL, Ethernet connections, fiber optic connections, wireless voice connections, text messaging services, media messaging services, and e-mail access services. These products are illustrative only. Other products may be represented by product data in other embodiments. In addition, while product data 320 is used in examples described herein, one or more principles and/or operations described herein may be similarly applied to other data stored in data store 315.

In certain embodiments, product data 320 may include data representative of one or more questions about one or more products and data representative of one or more answers to the questions. As described in more detail further below, a question about a product may be received (e.g., from an access device 120) and stored in data store 315. An answer to the question may also be received (e.g., from another access device 120) and stored in data store 315 in a manner that associates the answer to the question.

Product category data 325 may include data representative of one or more categories of products. In certain embodiments, product categories may include, but are not limited to, billing, cross-product topics, complex solutions development, conferencing (e.g., voice and/or web conferencing services), contact center solutions, collaboration solutions, global customer premises equipment ("CPE") resale, customer enablement, data networking, Internet services, IP communications (VoIP), IT solutions, Managed network solutions, mobility solutions, professional services solutions, security solutions, voice services, and product training categories, or any combination or sub-combination of these categories.

A product category may include one or more product subcategories. For example, a data networking services category may include subcategories such as ATM and frame relay, private IP, secure gateway services, private line, Ethernet services, IP-VPN dedicated services, ring services, and video connect services subcategories. In certain embodiments, product subcategories may be defined based on keywords associated with product data, an example of which is described further below.

Product data management subsystem 110 may be configured to organize product data 320 by product category and/or subcategory. For example, a product data entry stored in data store 315 may include a question and answer about a product associated with a product category. Product data management subsystem 110 may associate the product data entry with the product category, which may be used by the product data management subsystem 110 to process the product data entry and/or data included therein in accordance with a predefined workflow heuristic, as described further below.

The above-mentioned product categories and subcategories are illustrative only. Product categories and subcategories may be defined as may suit a particular implementation.

Keyword data 330 may include data representative of one or more keywords and their associations with one or more product data entries in the product data 320. As described further below, keywords may be defined and used by product data management subsystem 110 to search for and identify product data entries, questions, and/or answers related to the keywords.

User data 335 may include data representative of and/or associated with one or more users 130 provided with permission to access certain functions and/or data provided by product data management subsystem 110. For example, user data 335 may include, without limitation, authentication information, access device identifiers, information indicating associations between access devices 120 and users 130, and/or any other information useful for selectively providing users 130 with access to specific functions and/or data provided by product data management subsystem 110.

User data 335 may further include data representative of one or more user roles and associations between users 130 and user roles. A user role may specify functions and/or data to which a user 130 is granted access. One or more user roles may be assigned to a user 130.

In certain embodiments, user roles may include, but are not limited to, a regular user role ("regular user"), an author role ("author"), an approver role ("approver"), and an administrator role ("administrator"). A regular user role may provide a regular user with capabilities for accessing product data entries published for user access by product data management subsystem 110, creating and submitting questions to product data management subsystem 110, rating product data entries maintained by product data management subsystem 110, creating and appending comments to product data entries maintained by product data management subsystem 110, replying to such comments, printing product data entries, sending and/or receiving product data entries via e-mail and/or other messaging platform, and searching data store 315 for published product data entries.

An author role may provide an author with all of the capabilities of a regular user. In addition, an author role may provide an author with capabilities for accessing unpublished (e.g., "hidden") product data entries stored in data store 315, editing existing product data entries, changing statuses of product data entries to a "to-be-approved" workflow status, accessing questions about products that have not yet been answered (e.g., product data entries having "to-be-answered" workflow statuses), and access related data 345. These and other exemplary workflow statuses are described in more detail further below.

An approver role may provide an approver with all of the capabilities of an author and/or a regular user. In addition, an approver role may provide an approver with capabilities for changing statuses of product data entries to a "final-published" workflow status, accessing related data 345, accessing certain product data entries stored in data store 315 (e.g., entries having "to-be-approved," "final-unpublished," "nearing-expiration," and "out-of-date" workflow statuses), and providing input related to lifetime reviews of product data entries having an "out-of-date" workflow status.

An administrator role may provide an administrator with all of the capabilities of an approver, author, and/or regular user. In addition, an administrator role may provide an administrator with capabilities for deleting and editing comments appended to product data entries, creating and modifying product categories and subcategories, changing user roles assigned to users 130, associating authors and approvers with product categories, creating and changing geographical regions, and importing product data entries piecemeal or in bulk into data store 315.

Users 130 may be organized into one or more groups in system 100. For example, a group of user 130 may belong to a product team responsible for managing a particular product. Such a product team may include at least one author having permission to answer questions about the product and at least one approver having permission to approve such answers. As another example, a group of users 130 may be associated with a product category. Such a group of users 130 may include at least one author having permissions to answer questions about products within the product category and at least one approver having permission to approve such answers. User data 335 may include information indicating groupings of users 130 and/or associations between users 130 and one or more products. As described further below, such data may be used by product data management subsystem 110 to process product data 320 in accordance with a predefined workflow heuristic.

User data 335 may also include information about user subscriptions to product data 320 related to one or more products and/or product categories. Product data management subsystem 110 may use this information to automatically provide product data 320 associated with one or more products and/or product categories to one or more subscribing users 130.

Workflow data 340 may include data representative of one or more workflow statuses and associations between workflow statuses and one or more product data entries stored in data store 315. In certain embodiments, workflow statuses may include a "to-be-answered" workflow status configured to indicate a product data entry having an unanswered question, a "to-be-approved" workflow status configured to indicate a product data entry having an unapproved answer, a "final-unpublished" workflow status configured to indicate a product data entry having an approved and unpublished (e.g., hidden) answer, and a "final-published" workflow status configured to indicate a product data entry having an approved and published question and answer. Workflow statuses may also include an "out-of-date" workflow status configured to indicate a product data entry having an expired lifetime, which is described further below. Other workflow statuses may include a "near-expiration" workflow status (e.g., a status indicating an upcoming lifetime expiration (e.g., in less than fourteen days)) and a "recent-comment" workflow status (e.g., a status indicating a new comment has been posted recently (e.g., within the last fourteen days)). As described in more detail further below, workflow statuses may be used by product data management subsystem 110 to guide product data entries through one or more operations in accordance with a predefined workflow heuristic.

Related data 345 may include data related to product data 320, including data that may be potentially useful for determining an effectiveness of product data entries. For example, related data 345 may include comments posted about product data entries and user ratings of product data entries. As another example, related data 345 may include time-to-answer statistics, which may indicate a length of time to answer a question about a product. Time-to-answer statistics may be determined by product data management subsystem 110 as described further below. As yet another example, related data 345 may include a tracked number of views of one or more product data entries. These and other examples of related data 345 are described in more detail further below.

Lifetime data 350 may include data representative of one or more lifetimes of one or more product data entries stored in data store 315. For example, lifetime data may include a lifetime date specifying an expiration date and/or time for a product data entry. As described in more detail further below, a lifetime for a product data entry may be set (e.g. a lifetime expiration date defined), and when the lifetime expires, one or more operations may be automatically performed on the product data entry. For instance, the data entry may be hidden from user access (e.g., hidden from access by at least one user such as at least one user assigned a "regular user" role), transitioned from a "final-published" workflow status to an "out-of-date" workflow status, and/or designated for a lifetime review when the lifetime of the data entry expires. Examples of data entry lifetimes and operations that may be performed in response to reaching a lifetime expiration date are described further below.

A product data entry may include any combinations or sub-combinations of the above-described data and/or references to the above-described data stored in data store 315. The product data entry may be stored in any suitable way, including as a single data object or as multiple data objects associated with one another and including a combination or sub-combination of the above-described data and/or references to the above-described data stored in data store 315. In certain embodiments, the product data entry may be formed by logical references between instances of data stored in data store 315 (e.g., relationships between data included in tables of a relational database).

FIG. 4 illustrates an exemplary product data entry 400 (or simply "data entry 400" or "entry 400"). As shown in FIG. 4, data entry 400 may include or be associated with data representative of a question 405, an answer 410, at least one category 415, at least one subcategory 420, one or more keywords 425, user data 430, a workflow status 435, related data 440, and lifetime date 445. These particular instances of data may be associated with one another in any suitable way in data store 315. As an example, question 405 may include data representative of a question about a product, answer 410 may include data representative of an answer to the question, category 415 may include data representative of one or more product categories associated with question 405, answer 410, and/or entry 400, subcategory 420 may include data representative of one or more product subcategories associated with question 405, answer 410, and/or entry 400, keywords 425 may include data representative of one or more keywords associated with question 405, answer 410, and/or entry 400, user data 430 may include data representative of one or more users 130 and/or user roles associated with entry 400 (e.g., data indicating a regular user who provided question 405, an author who provided answer 410, and an approver who approved the question 405 and answer 410 for publication), workflow status 435 may include data representative of a workflow status associated with entry 400, related data 440 may include any instances of related data 345 associated with entry 400, and lifetime date 445 may include data representative of a lifetime expiration date for entry 400. Entry 400 is illustrative only. Other entries including other combinations or sub-combinations of associated data may be stored in data store 315 and/or formed by product data management subsystem 110.

Returning to FIG. 3, product data management subsystem 110 may include a product information management module 360, which may include or be implemented as hardware, computing instructions (e.g., software) tangibly embodied on a computer-readable medium, or a combination of hardware and computing instructions configured to perform and/or direct processing module 310 to perform one or more of the product management and/or workflow operations described herein. In certain embodiments, product information management module 360 may be implemented as a software application embodied on a computer-readable medium such as data store 315 and configured to direct the processing module 310 to execute one or more of the processes described herein. Hence, product information management module 360 may be configured to perform and/or direct processing module 310, and consequently product data management subsystem 110, to perform one or more of the data management and workflow operations described herein.

Exemplary product data management and workflow methods will now be described in reference to FIGS. 5A-5B, 6, and 7. While these figures illustrate exemplary steps according to certain embodiments, other embodiments may omit, add to, reorder, combine, and/or modify any of the steps shown in the figures. For example, one or more steps shown in one of the figures may be combined with one or more steps shown in one or more of the other figures. One or more steps shown in the figures may be performed by product data management subsystem 110.

Figure 5A:
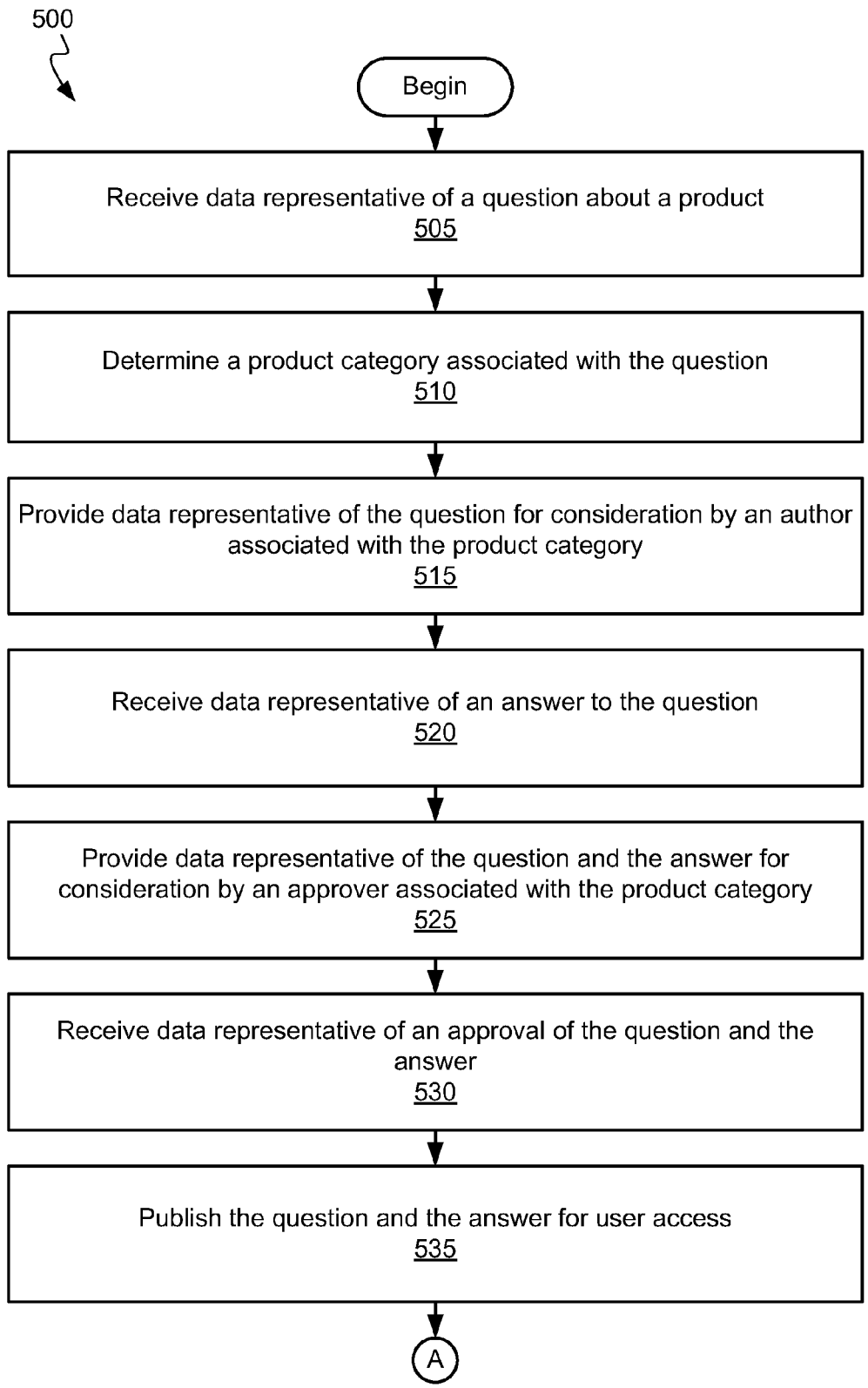
FIGS. 5A-5B illustrate an exemplary product data management and workflow method.
Figure 5B:
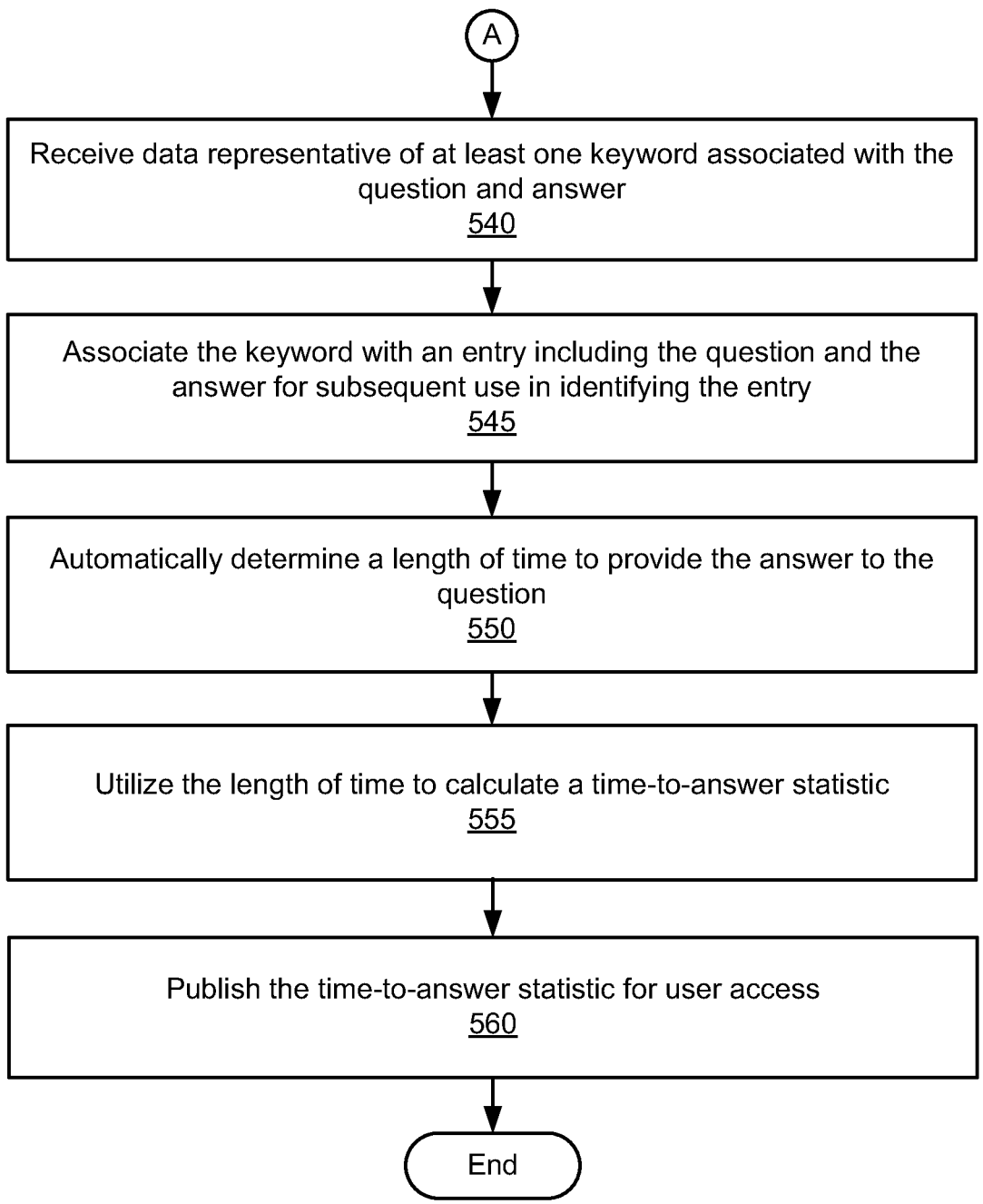

FIGS. 5A-5B illustrate an exemplary product data management and workflow method 500. As shown in FIG. 5A, at step 505, data representative of a question about a product may be received. For example, product data management subsystem 110 may receive data representative of a question about a product from an access device 120. The question may be authored by a user 130 (a user 130 assigned a regular user role) of the access device 120, which may transmit data representative of the question to product data management subsystem 110 over network 125.

At step 510, a product category associated with the question may be determined. For example, product data management subsystem 110 may determine a product category associated with the question. Product data management subsystem 110 may make the determination in any suitable way, including making the determination based on one or more words included in the question and/or on a user-selected product category (e.g., a product category selected by a user 130 who authored the question). In certain examples, step 510 may include product data management subsystem 110 determining that one or more product categories, including one or more product subcategories, are associated with the question.

As step 515, data representative of the question may be provided for consideration by an author associated with the product category. For example, product data management subsystem 110 may make data representative of the question available for access and consideration by a user 130 assigned an author role. This may be accomplished in any suitable way, including by notifying the author of the question and/or transmitting data representative of the question to an access device 120 associated with the author. The author may be a member of a predefined user group associated with the product category.

With access to the question, the author may draft an answer to the question. For example, the author may input data representative of an answer to the question into an access device 120, which may transmit data representative of the answer to product data management subsystem 110 over network 125.

At step 520, data representative of an answer to the question may be received. For example, product data management subsystem 110 may receive data representative of an answer to the question from an access device 120. As described above, the answer may be authored by a user 130 (a user 130 assigned an author role) of the access device 120, which may transmit data representative of the answer to product data management subsystem 110 over network 125.

At step 525, data representative of the question and the answer may be provided for consideration by an approver associated with the product category. For example, product data management subsystem 110 may make data representative of the question and the answer available for access and consideration by a user 130 assigned an approver role. This may be accomplished in any suitable way, including by notifying the approver of the question and answer and transmitting data representative of the question and answer to an access device 120 associated with the approver. The approver may be a member of a predefined user group associated with the product category.

With access to the question and answer, the approver may review and approve of the question and answer. For example, the approver may input data representative of an approval of the question and answer into an access device 120, which may transmit data representative of the approval to product data management subsystem 110 over network 125.

At step 530, data representative of an approval of the question and the answer may be received. For example, product data management subsystem 110 may receive data representative of an approval of the question and answer from an access device 120. As described above, the approval may be provided by a user 130 (a user 130 assigned an approver role) of the access device 120, which may transmit data representative of the approval to product data management subsystem 110 over network 125.

At step 535, the question and the answer may be published for user access. For example, product data management subsystem 110 may make the question and answer available for user access via one or more access devices 120 over network 125. Accordingly, publication of the question and answer at step 535 may make the question and answer accessible to one or more users 130 of one or more access devices 120 over network 125.

The method 500 may continue at step 540 shown in FIG. 5B. At step 540, data representative of at least one keyword associated with the question and the answer may be received. For example, product data management subsystem 110 may receive data representative of the keyword(s) from an access device 120. The received keyword(s) may be designated by a user 130. In certain examples, for instance, the keyword(s) may be input by a user 130 (a user 130 assigned a regular user role, author role, or approver role) of the access device 120, which may transmit data representative of the keyword(s) to product data management subsystem 110 over network 125.

At step 545, the keyword(s) may be associated a data entry including the question and the answer for subsequent use in identifying the data entry. For example, product data management subsystem 110 may associate the keyword(s) with a data entry (e.g., data entry 400) associated with the question and answer. The association may be accomplished in any way suitable to support subsequent use of the keywords to locate the data entry including the question and answer. For example, a user 130 may search data stored in data store 315 by keyword to identify the data entry.

At step 550, a length of time to provide the answer to the question is automatically determined. For example, product data management subsystem 110 may automatically determine a length of time to provide the answer to the question. The determination may be made in any suitable way. For instance, product data management subsystem 110 may monitor and record timestamps associated with events and use the timestamps to determine a length of time. In certain examples, the length of time may include a period of time from receipt of the question at step 505 until receipt of the answer at 520 or publication of the answer at step 535.

At step 555, the length of time may be utilized to calculate a time-to-answer statistic. For example, product data management subsystem 110 may utilize the length of time to calculate a time-to-answer statistic. A time-to-answer statistic may include any statistic related to one or more time periods associated with providing one or more answers to one or more questions. For example, a time-to-answer statistic may include an average time-to-answer for a particular user 130 (e.g., a user 130 assigned an author or approver role) over a period of time. As another example, a time-to-answer statistic may include an average time-to-answer for a particular product, product category, product sub-category, and/or user group (e.g., a product team). Length-of-time data and/or time-to-answer statistics, which product data management subsystem 110 may store as part of related data 345 in data store 315, may be useful to one or more users 130, practices, and strategies of an enterprise.

At step 560, the time-to-answer statistic may be published for user access. For example, product data management subsystem 110 may make the time-to-answer statistic available for user access via one or more access devices 120 over network 125. Accordingly, publication of the time-to-answer statistic at step 560 may make the time-to-answer statistic accessible to one or more users 130 of one or more access devices 120 over network 125.

Figure 6:
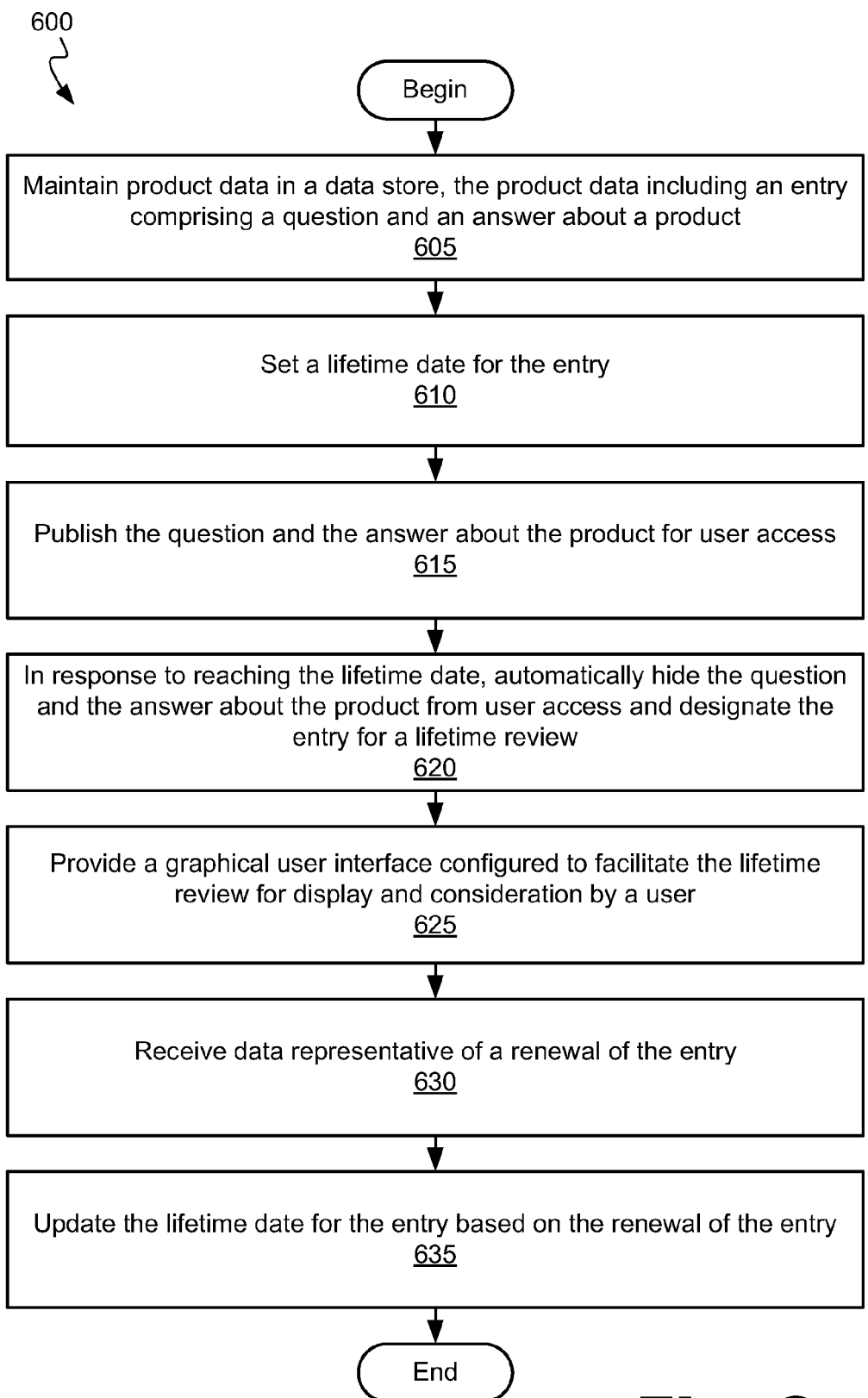
FIG. 6 illustrates another exemplary product data management and workflow method.

FIG. 6 illustrates another exemplary product data management and workflow method 600. As shown in FIG. 6, at step 605, product data is maintained in a data store, the product data including an entry comprising a question and an answer about a product. For example, product data management subsystem 110 may maintain product data 320 in data store 315. The product data 320 may include an entry having a question and an answer (e.g., data entry 400 including question 405 and answer 410). In certain examples, the question and answer may include the question and answer received in steps 505 and 520, respectively, of FIG. 5A.

At step 610, a lifetime date is set for the entry. For example, product data management subsystem 110 may set a lifetime date for the entry. The lifetime date may be set by product data management subsystem 110 in any suitable way. As an example, a lifetime date for the entry may be determined and set based on a predetermined default lifetime (e.g., a one-hundred-twenty-day default lifetime).

As another example, a lifetime date for the entry may be determined and set based on a user designation. For instance, product data management subsystem 110 may provide data representative of a GUI to an access device 120 for display by the access device 120. The GUI may be configured to facilitate a user designation of a lifetime for the entry. The user designation may be facilitated in any suitable way, including by displaying in the GUI a plurality of selectable lifetimes and detecting a user selection of one of the lifetimes from the plurality of selectable lifetimes. Product data management subsystem 110 may receive data representative of the user designation of a lifetime and set the lifetime date for the entry based on the data representative of the user designation of the lifetime for the entry. Product data management subsystem 110 may store data representative of the lifetime date as part of the lifetime data 350 in data store 315 and may associate the lifetime date with the entry in any suitable manner.

At step 615, the question and the answer about the product may be published for user access. For example, product data management subsystem 110 may make the question and answer available for user access via one or more access devices 120 over network 125. Accordingly, publication of the question and answer at step 635 may make the question and answer accessible to one or more users 130 (e.g., users 130 assigned regular user roles) of one or more access devices 120 over network 125.

At step 620, in response to the lifetime date being reached, the question and answer about the product data may be automatically hidden from user access and the entry may be designated for a lifetime review. For example, product data management subsystem 110 may detect the lifetime date being reached, and in response, may automatically hide the question and answer from user access such that one or more users 130 (e.g., users 130 assigned regular user roles) are unable to access the question and answer. The hiding of the question and answer from user access may be accomplished in any suitable way, including by changing a workflow status of the entry to un-publish the question and answer.

In response to the lifetime date being reached, product data management subsystem 110 may also automatically designate the entry for a lifetime review. The designation may be made in any suitable way, including by changing a workflow status of the entry. The lifetime review may include any automated, manual, and/or combination of automated and manual review of the lifetime and/or the contents of the entry. For example, a user 130 (e.g., a user 130 assigned an author or approver role) may utilize an access device 120 to access and review the contents of the entry and determine whether the question and answer are up-to-date or outdated (e.g., if a product has changed since the question or answer were received). In certain examples, designating an entry for a lifetime review may include notifying one or more users 130 that the entry is ready for a lifetime review.

At step 625, a GUI configured to facilitate the lifetime review is provided for display and consideration by a user. For example, product data management subsystem 110 may provide data representative of a GUI to an access device 130 for display. A user 130 of the access device 130 may then view and consider the GUI.

The GUI may be configured to facilitate a lifetime review in any suitable way. For example, the GUI may include displayed therein data representative of the question and answer for review by a user 130. The GUI may also include any other data associated with the entry, including a publication date and lifetime date associated with the entry.

In addition, the GUI may include one or more tools configured to be utilized by a user 130 of an access device 120 to select an operation to be performed on the entry. For example, the GUI may include an entry renewal tool that may be used by a user 130 to select a renewal of an entry when the user 130 determines the question and answer include up-to-date information. The GUI may also include an option for deleting the entry if the question and answer are determined to be outdated. An exemplary GUI configured to facilitate a lifetime review of an entry and/or including one or more tools for selecting an operation to be performed on the entry is described further below.

At step 630, data representative of a renewal of the entry is received. For example, product data management subsystem 110 may receive data representative of a renewal of the entry from an access device 120 over network 125. The renewal may represent an intention of a user 130 to renew an entry.

At step 635, the lifetime date for the entry is updated based on the renewal of the entry. For example, product data management subsystem 110 may update the lifetime date for the entry based on the data representative of the renewal, including extending the lifetime date to a future date. In response to the lifetime date being extended into the future, product data management subsystem 110 may automatically republish the question and the answer associated with the entry for user access. Steps 620-635 may be repeated when the extended lifetime date is reached. In this fashion, product data management subsystem 110 may automatically facilitate regular lifetime reviews of an entry, which may help ensure that published product data 320 remains up-to-date and that outdated product data 320 is hidden and/or deleted.

Figure 7:
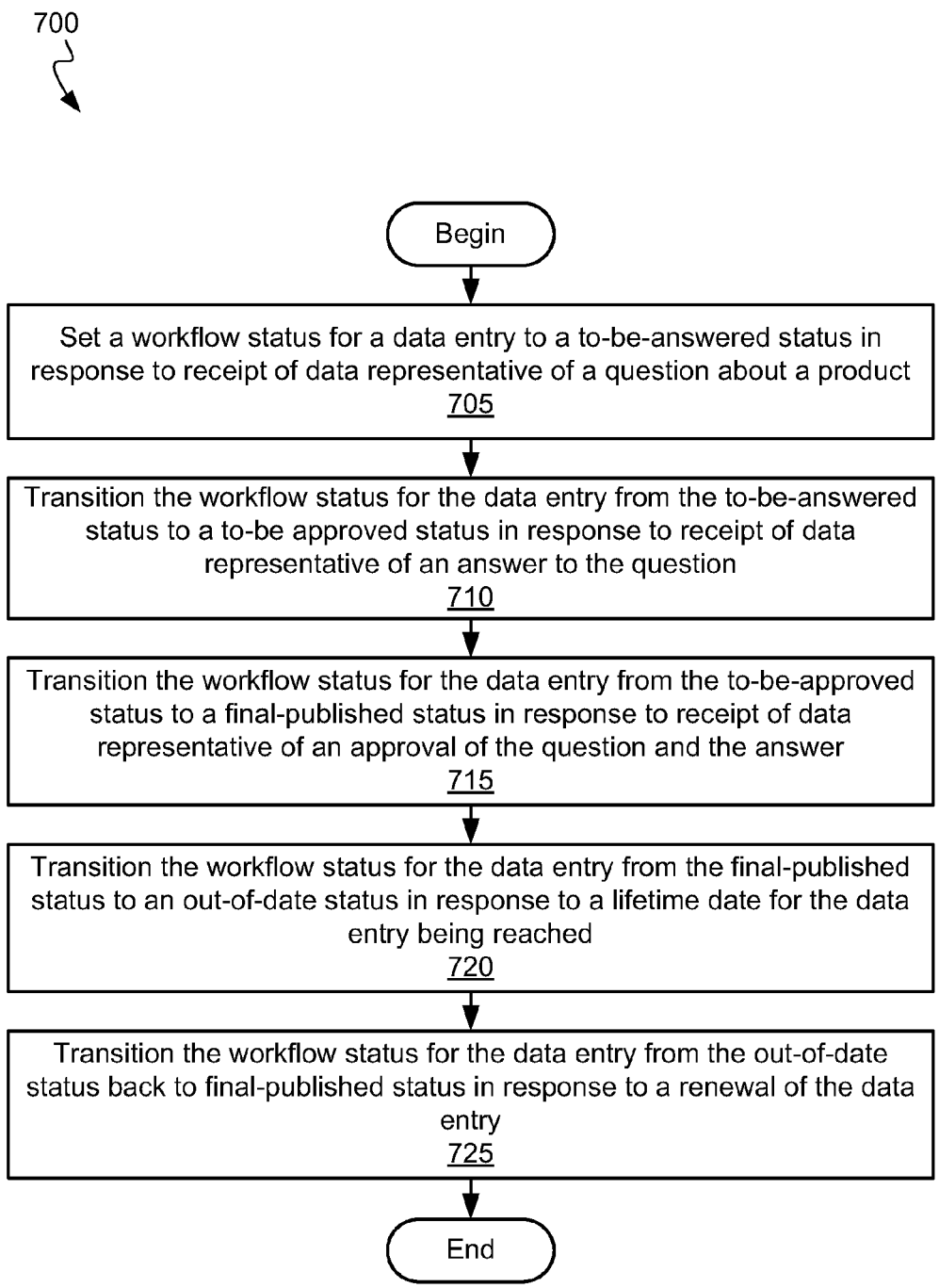
FIG. 7 illustrates yet another exemplary product data management and workflow method.

FIG. 7 illustrates another exemplary product data management and workflow method 700. As shown in FIG. 7, at step 705, a workflow status for a data entry may be set to a "to-be-answered" status in response to receipt of data representative of a question about a product. For example, product data management subsystem 110 may set a workflow status for a data entry to a "to-be-answered" status in response to receipt of data representative of a question about a product. In certain examples, product data management subsystem 110 may set the workflow status for the data entry to a "to-be-answered" status in response to receipt of a question about a product at step 505 of FIG. 5A. This status may, in turn, cause product data management subsystem 110 to provide data representative of the question for consideration by an author at step 515 of FIG. 5A such that the author may have an opportunity to author and input an answer to the question.

At step 710, the workflow status for the data entry may be transitioned from the "to-be-answered" status to a "to-be-approved" status in response to receipt of data representative of an answer to the question. For example, product data management subsystem 110 may transition the workflow status for the data entry from the "to-be-answered" status to a "to-be-approved" status in response to receipt of data representative of an answer to the question. In certain examples, product data management subsystem 110 may transition the workflow status for the data entry to a "to-be-approved" status in response to receipt of an answer to the question at step 520 of FIG. 5A. This status may, in turn, cause product data management subsystem 110 to provide data representative of the question and answer for consideration by an approver at step 525 of FIG. 5A such that the approver may have an opportunity to review and approve or not approve of the question about the product and/or the answer to the question.

At step 715, the workflow status for the data entry may be transitioned from the "to-be-approved" status to a "final-published" status in response to receipt of data representative of an approval of the question and/or answer. For example, product data management subsystem 110 may transition the workflow status for the data entry from the "to-be-approved" status to a "final-published" status in response to receipt of data representative of an approval of the question and/or answer. In certain examples, product data management subsystem 110 may transition the workflow status for the data entry to a "final-published" status in response to receipt of an approval of the question and answer at step 530 of FIG. 5A. This status may, in turn, cause product data management subsystem 110 to publish the question and the answer for user access at step 535 of FIG. 5A such that one or more users 130 (e.g., one or more users 130 assigned a regular user role) may have access to the question and the answer.

At step 720, the workflow status for the data entry may be transitioned from the "final-published" status to an "out-of-date" status in response to a lifetime date for the data entry being reached. For example, product data management subsystem 110 may transition the workflow status for the data entry from the "final-published" status to an "out-of-date" status in response to a lifetime date for the data entry being reached. In certain examples, product data management subsystem 110 may transition the workflow status for the data entry to an "out-of-date" status in response to a lifetime date for the data entry being reached at step 620 of FIG. 6. This status may, in turn, cause product data management subsystem 110 to automatically hide the question and the answer from user access and designate the entry for a lifetime review at step 620 of FIG. 6 such that one or more users 130 (e.g., one or more users 130 assigned an author, approver, or administrator role) may have an opportunity to review the question and answer and to renew or not renew publication of the data entry.

At step 725, the workflow status for the data entry may be transitioned from the "out-of-date" status back to "final-published" status in response to a renewal of the data entry. For example, product data management subsystem 110 may transition the workflow status for the data entry from the "out-of-date" status back to "final-published" status in response to a renewal of the data entry. In certain examples, product data management subsystem 110 may transition the workflow status for the data entry back to a "final-published" status in response to receipt of a renewal of the data entry at step 630 of FIG. 6. This status may, in turn, cause product data management subsystem 110 to republish the question and the answer for user access at step 535 of FIG. 5A such that one or more users 130 (e.g., one or more users 130 assigned a regular user role) may again have access to the question and the answer.

Product data management subsystem 110 may be configured to perform one or more of the steps shown in FIGS. 5A-5B, 6, and 7 in accordance with a predefined workflow heuristic. For example, product information management module 360 may maintain and/or access a predefined workflow heuristic and direct product data management subsystem 110 to perform one or more of the steps shown in FIGS. 5A-5B, 6, and 7 based on the predefined workflow heuristic. One or more of the workflow statuses described herein may be defined in the heuristic and may be used to trigger one or more operations, including in any of the ways described above. While certain exemplary workflow statuses and operations are described herein, they are illustrative only. Other workflow statuses and operations may be defined in a predefined workflow heuristic in other embodiments and/or as may suit a particular implementation.

To further illustrate exemplary product data management and workflow systems and methods, a number of exemplary graphical user interfaces ("GUIs") that may be provided by the exemplary systems and methods described herein for display will now be described in reference to FIGS. 8-16. In certain embodiments, product data management subsystem 110 may provide data representative of one or more of the exemplary GUIs to one or more access devices 120, which may display one or more of the GUIs for consideration by one or more authorized users 130. For example, product data management subsystem 110 may transmit data representative of a GUI to an access device 120 over network 125, and the access device 120 may display the GUI for consideration of a user 130. One or more of the exemplary GUIs may be configured to facilitate receipt of user input, which user input may be used by product data management subsystem 110 to trigger and perform one or more operations. Accordingly, an authorized user 130 (e.g., a user having a valid login and password) may interact with the systems and methods described herein by way of one or more GUIs provided by the systems and methods and displayed by an access device 120.

Figure 8:
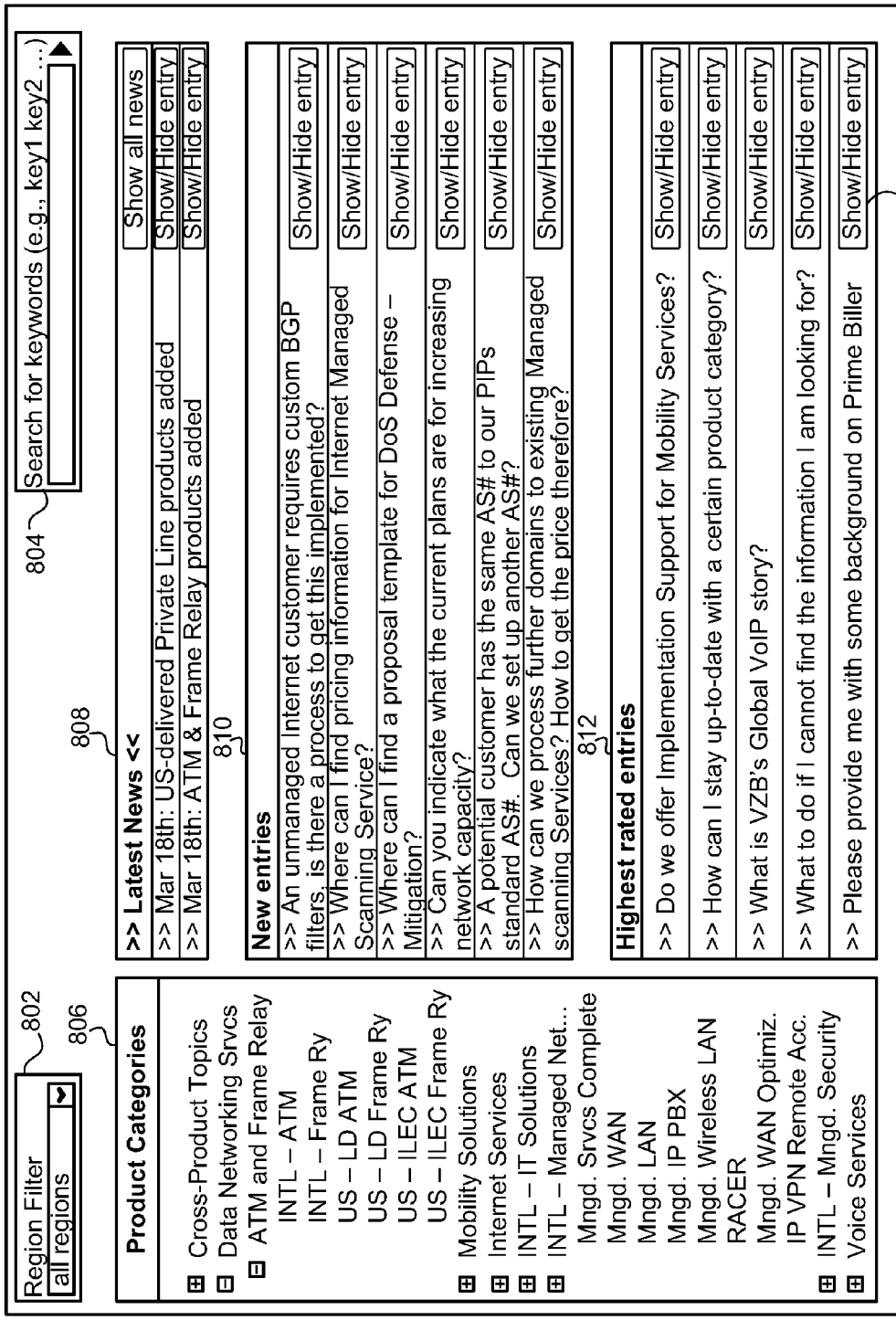

FIG. 8 illustrates a GUI 800 having an exemplary product data management view displayed therein. As shown in FIG. 8, GUI 800 may include a region filter tool 802, keyword search tool 804, product category tree 806, latest news section 808, new entries section 810, and highest rated entries section 812. Latest news section 808 may include any recently provided information related to products represented by product data 320 and/or features of system 100. New entries section 810 may include one or more data entries (e.g., entry 400) or any combination of information included in one or more data entries that have been recently added to data store 315. Highest rated entries section 812 may include one or more data entries (e.g., entry 400) or any combination of information included in one or more data entries stored in data store 315 and that are associated with user ratings that are comparatively higher than the user ratings of other data entries stored in data store 315. In sections 810 and 812 of GUI 800, each of the entries includes a display of a question about a product and a tool (e.g., tool 814) which may be selected by a user 130 to selectively show or hide the corresponding entry in GUI 800. Tool 814 may facilitate a user 130 toggling between an expanded and a hidden view of a data entry in GUI 800.

Keyword search tool 804 may facilitate a keyword search of data entries stored in data store 315. For example, a user may input one or more keywords (e.g., keywords descriptive of a question about a product) into a field of keyword search tool 804 and initiate a search for those keywords in data entries in data store 315. In addition to keyword search tool 804, one or more other tools may be provided to assist with searches of data entries stored in data store 315. For example, region filter tool 802 may facilitate a user selecting one or more of a plurality of geographic regions to which a search of data entries may be restricted. For instance, a search may be restricted to data entries related to a particular geographic area (e.g., product data 320 representative of products provided in the United States). As another example, a search of data entries in data store 315 may be restricted by product category and/or subcategory. For instance, although not shown in FIG. 8, alternative embodiments of GUI 800 may include a product category filter tool configured to facilitate a user selecting one or more of a plurality of product categories to which a search of data entries may be restricted. One or more data entries identified by product data management subsystem 110 in a search of data store 315, or any information associated with the identified data entries, may be displayed in GUI 800 for consideration by a user 130.

Product category tree 806 may include a hierarchical list of product categories and/or subcategories. The list may include one or more of the categories and/or subcategories represented by product category data 325 in data store 315. FIG. 8 illustrates an exemplary hierarchical list of certain product categories and subcategories. For example, within product category tree 806, a "data networking services" category includes an "ATM and Frame Relay" subcategory, which includes multiple other subcategories corresponding to certain products (e.g., international frame relay ("INTL—Frame Relay")). Product category tree 806 may facilitate user location and selection of one or more product categories, product subcategories, and/or data entries associated with particular product categories and/or subcategories.

FIG. 9 illustrates a GUI 900 having another exemplary product data management view displayed therein. In certain embodiments, the view in GUI 900 may be displayed in response to a user selection of a product category or subcategory in product category tree 806 of GUI 800. A selector 902 shown in FIG. 9 represents a user selection of a product subcategory called "Managed LAN," which is a subcategory of a product category called "INTL—Managed Network . . . ."

In response to a user selection of the "Managed LAN" subcategory, a graphical window 904 including content specific to the selected subcategory may be displayed in GUI 900, as shown in FIG. 9. As illustrated, graphical window 904 may include a description 906 of the corresponding product category and/or subcategory.

Graphical window 904 may also include a subscription tool 908. A user 130 may utilize subscription tool 908 to set a subscription status (e.g., "subscribed" or "not subscribed") related to the selected product category or subcategory. For example, a user 130 of an access device 120 may utilize subscription tool 908 to subscribe to receive product data 320 related to a selected category or subcategory. In certain examples, product data management subsystem 110 may send automatic notifications and/or copies of new and/or updated data entries associated with the selected product category or subcategory to which a user 130 is subscribed. This product data 320 may be automatically sent to the subscribing user 130 in any suitable format, including e-mail, text messaging, and other formats. For instance, when a new data entry related to a product category is published by product data management subsystem 110 as described above, product data management subsystem 110 may automatically provide a copy of the published data entry and/or a notification of the publication of the data entry to one or more access devices 120 associated with one or more users 130 subscribing to the product category.

As shown in FIG. 9, graphical window 904 may include keyword list 910. In certain embodiments, each of the keywords in the list 910 may be a subcategory of the product category or subcategory selected in product category tree 806. Accordingly, in the illustrated example, each of the keyword subcategories (e.g., availability, CPE, collateral, contracting, customer benefits, pricing, product features, reporting and monitoring, and service level agreement) in the list 910 is associated with the "Managed LAN" product subcategory selected in product category tree 910.

One or more of the keyword subcategories in graphical window 904 may be expandable to reveal one or more data entries, or any data in one or more data entries, associated with the expanded keyword category. In FIG. 9, a keyword subcategory called "contracting" is expanded to reveal three data entries, including data entry 912. As shown, data entry 912 includes a question about a Managed LAN product and a tool for selectively showing (e.g., expanding) or hiding the data entry 912.

Figure 10:
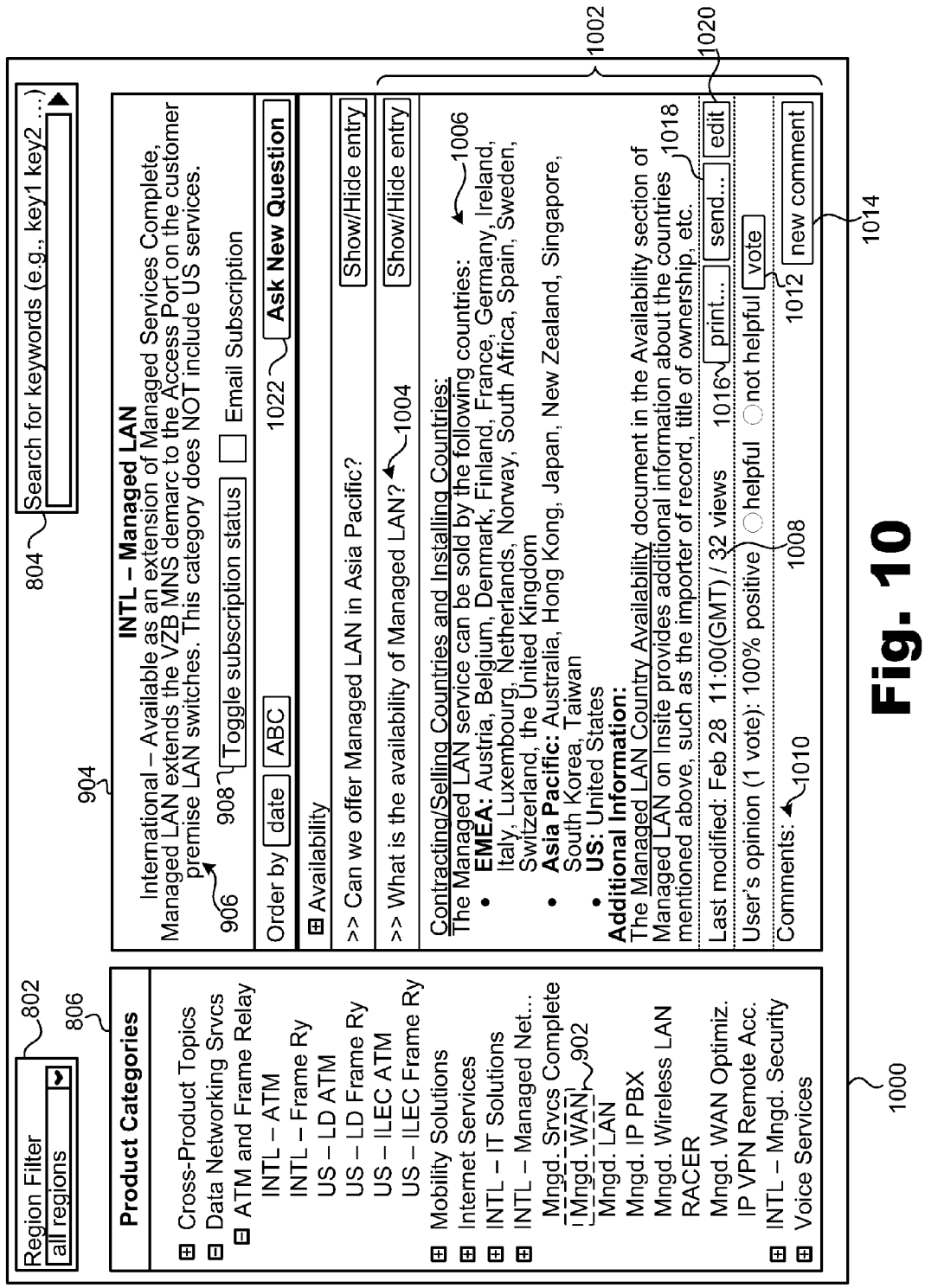

FIG. 10 illustrates a GUI 1000 having another exemplary product data management view displayed therein. In certain embodiments, the view in GUI 1000 may be displayed in response to an expansion of a data entry within a keyword category displayed in GUI 900. For example, the view illustrated in FIG. 10 may be displayed in response to an expansion of a data entry within a keyword category called "availability" in graphical window 904.

As shown in FIG. 10, an expanded data entry 1002 may include a question 1004 and an answer 1006 about availability of a "Managed LAN" product. In certain examples, the answer 1006 may include links to additional information, which may include information provided by external sources (e.g., information maintained in another data store and/or by a third party) and related to the question 1004 and/or answer 1006.

Expanded data entry 1002 may also include other information. For example, expanded data entry 1002 may include any related data 345 associated with the data entry, such as a date of last modification and/or number of times that the data entry has been viewed, as represented by reference number 1008 in FIG. 10. In addition, expanded data entry 1002 may include one or more user comments that have been received for the data entry. Such comments may be displayed in a comment section 1010 in GUI 1000.

In certain embodiments, expanded data entry 1002 may include region data indicating one or more geographic regions associated with a data entry, product, question 1004, and/or answer 1006. For example, in FIG. 10, answer 1006 includes region data indicating geographic regions in which a product (e.g., a managed LAN) is offered. Additionally or alternatively, region data indicating one or more geographic regions associated with a data entry, product, question 1004, and/or answer 1006 may be displayed in one or more other GUIs, including in association with graphical representations of data entries in FIG. 8 and/or FIG. 9.

Expanded data entry 1002 may include one or more tools configured to facilitate receipt of user input. For example, expanded data entry 1002 may include a feedback tool 1012 configured to facilitate a user providing feedback about (e.g., a rating of) the data entry. In FIG. 10, feedback tool 1012 is configured to facilitate a user casting a vote as to whether the data entry is helpful or not helpful. In addition, expanded data entry 1002 may include a comment tool 1014 configured to facilitate a user providing a new comment about the data entry. In certain embodiments, in response to a user selection of comment tool 1014, product data management subsystem 110 may provide a comment window (e.g., a pop-up edit window in GUI 1000). Within the comment window, a user 130 may view a list of comments associated with the data entry that have been previously received by product data management subsystem 110. In addition, the comment window may include one or more tools configured to facilitate a user 130 inputting a new comment and/or replying to any of the existing comments. Accordingly, the comment window may display a discussion thread related to a data entry.

In certain embodiments, product data management subsystem 110 may be configured to process user comments associated with a data entry in accordance with a predefined workflow heuristic, which may be defined as may suit a particular implementation, including similarly to the exemplary predefined workflow heuristics for data entries described herein. As an example, product data management subsystem 110 may be configured to detect receipt of a new comment from a user (e.g., a regular user) and assign the new comment a "new" workflow status. Product data management subsystem 110 may be further configured to provide data representative of the new comment having a "new" workflow status to one or more authors and/or approvers. For example, the new comment may be included in a list accessible to the author(s) and/or approver(s). An author or approver may review the new comment and decide whether to answer the new comment (e.g., when the new comment includes a follow-up question). When the author or approver answers the new comment, product data management subsystem 110 may automatically transition the workflow status of the comment from "new" to "answered." Alternatively, the author or approver may decide not to provide an answer to the new comment (e.g., the new comment does not include a follow-up question). In this case, product data management subsystem 110 may automatically transition the workflow status of the comment from "new" to "reviewed" to indicate that it has been considered by an author or approver. Such a workflow status heuristic may help ensure that user comments are addressed by at least one author or approver.

As shown in FIG. 10, expanded data entry 1002 may include a print tool 1016 configured to facilitate printing of the data entry, a send tool 1018 configured to facilitate sending (e.g., e-mailing) a copy of the data entry elsewhere (e.g., to another user 130), and an edit tool 1020 configured to facilitate a user 130 editing the data entry. In response to selection of edit tool 1020, product data management subsystem 110 may provide an editing window (e.g., a pop-up editing window in GUI 1000) within which a user 130 may edit the data entry. An editing window may employ any suitable data editing programs, and product data management subsystem 110 may be configured to process any data input into an editing window as may suit a particular implementation (e.g., creating HTML code for input data in the background).

Figure 11:
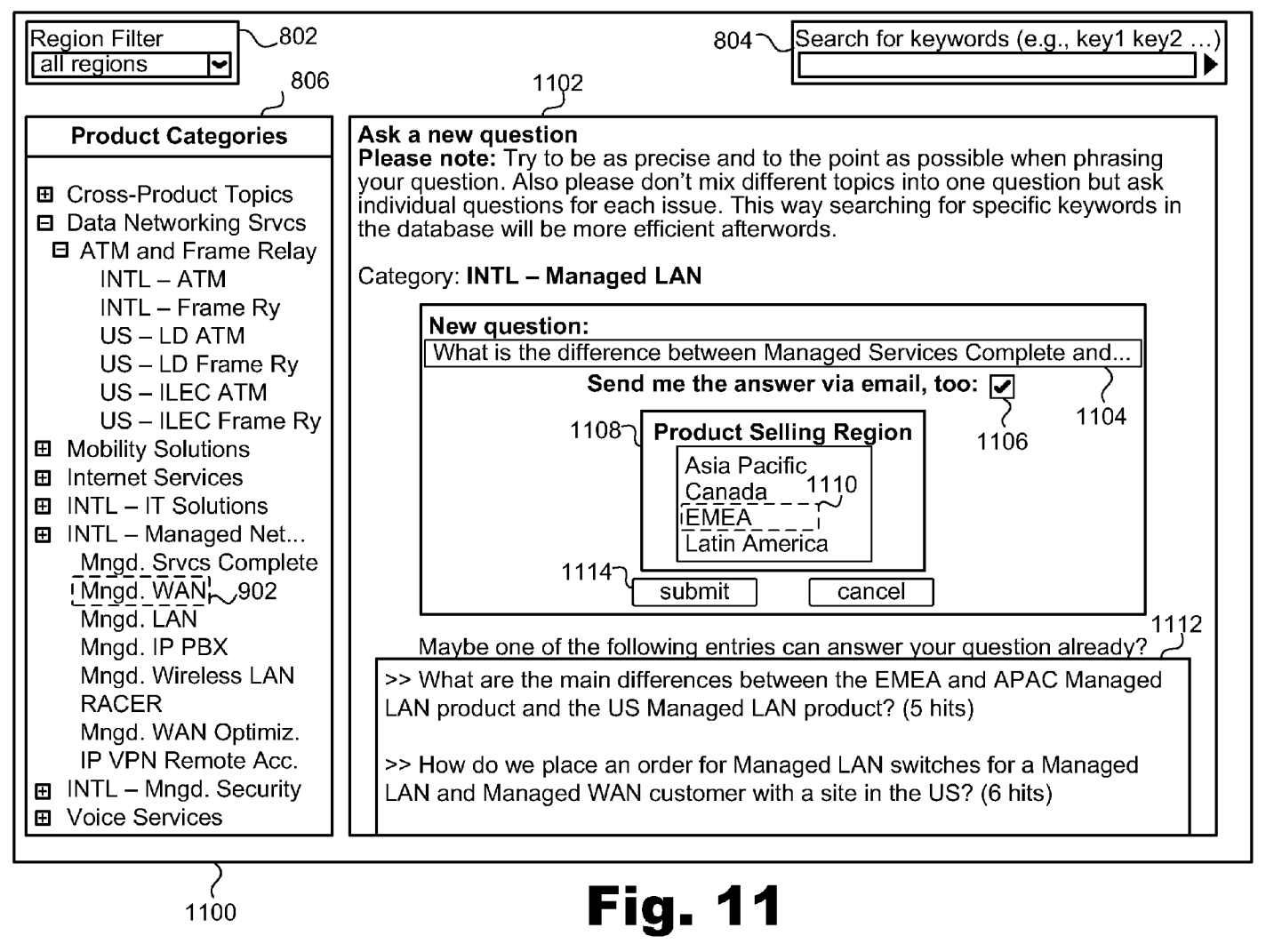

Product data management subsystem 110 may provide one or more tools configured to facilitate a user 130 providing a new question about a product. For example, GUI 1000 may include a new question tool 1022, which may be selected by a user 130. In response to a user selection of new question tool 1022, a new question composition section may be displayed. For example, FIG. 11 illustrates a GUI 1100 having another exemplary product data management view displayed therein. As shown in FIG. 11, GUI 1100 may include a new question composition section 1102, which may include information and/or one or more tools configured to facilitate user entry of a new question.

As shown in FIG. 11, a new question composition section 1102 of GUI 1100 may include a new question field 1104 in which a new question may be input by a user 130. New question composition section 1102 may also include a delivery selection tool 1106 configured to facilitate user selection of one or more options by which an answer to the question may be provided. In FIG. 11, delivery selecting tool 1106 facilitates a user selection as to whether an answer to the new question may be sent to a user via e-mail. In addition, new question composition section 1102 may include a region selection tool 1108, which may be configured to facilitate a user selection of one or more geographic regions for association with the new question. In FIG. 11, a selector 1110 indicates a user selection of a geographic region referred to as "EMEA."

GUI 1100 may include a suggestion section 1112, which may include one or more data entries which product data management subsystem 110 has determined to have potential relevance to a new question. In the example illustrated in FIG. 11, suggestion section 1112 includes two questions determined by product data management subsystem 110 to have potential relevance to a new question being input in new question field 1104. Potentially relevant data entries may be identified by product data management subsystem 110 in any suitable way. For example, product data management subsystem 110 may identify one or more keywords from text entered into new question field 1104 and use the identified keywords to search for potentially related data entries. Alternatively or additionally, product data management subsystem 110 may use product category and/or subcategory information and/or selected geographic regions to identify potentially relevant data entries. Accordingly, a user 130 entering a new question may be able to determine from information displayed in the suggestion section 112 whether the new question has already been answered in a data entry stored in data store 315. In certain examples, suggested data entries may be displayed in suggestion section 1112 in real time as a user 130 enters a new question in new question field 1104.

Figure 12:
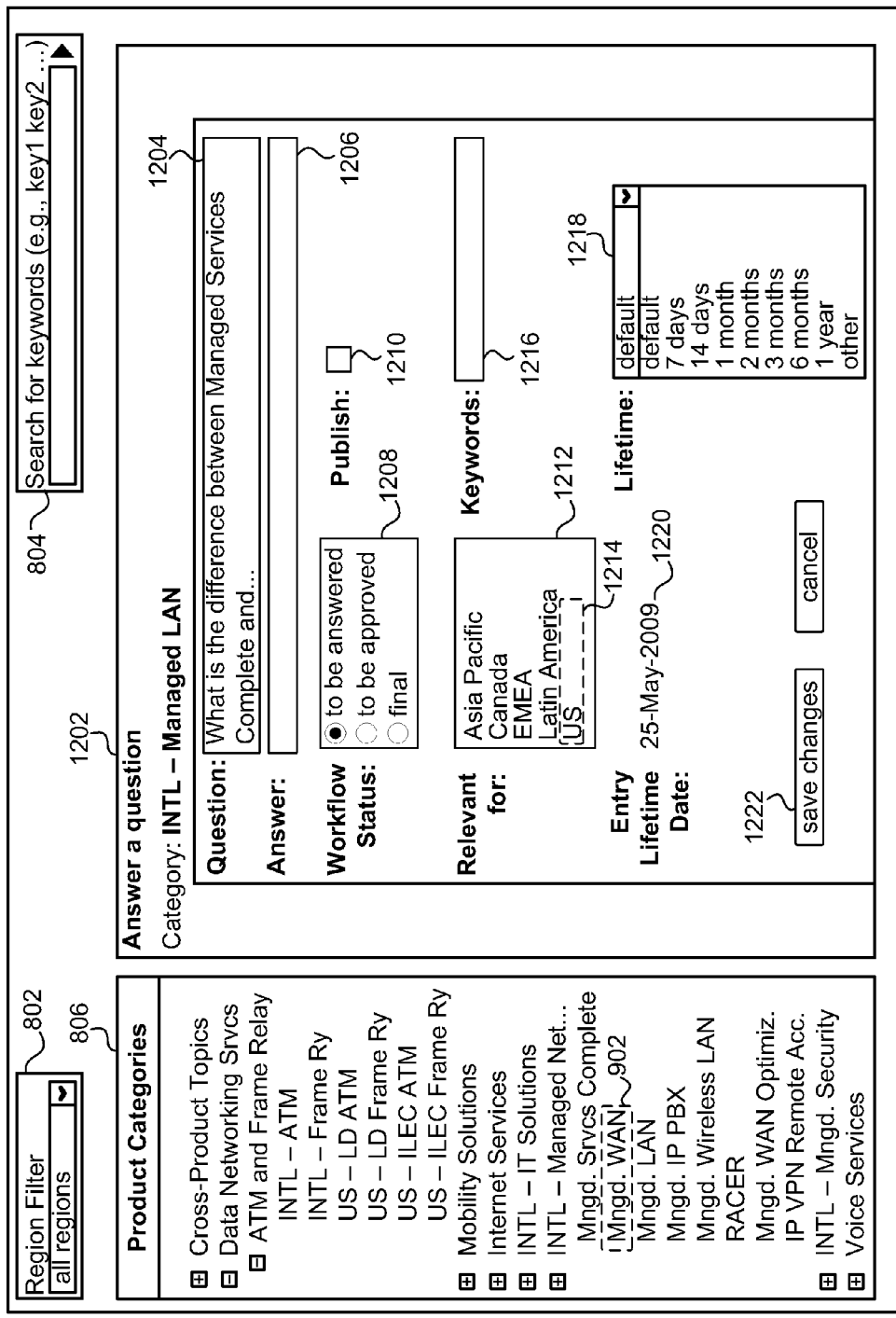

A user 130 may submit a new question to product data management subsystem 110 in any suitable way, including by using new question composition section 1102 in GUI 1100 to input a new question as described above and selecting a submit button 1114 in GUI 1100 to initiate submission of the new question to product data management subsystem 110. Product data management subsystem 110 may receive data representative of the new question and perform one or more operations related to the new question as described above. For example, as described above, product data management subsystem 110 may provide data representative of the question for consideration by an author (i.e., a user 130 assigned an author, approver, or administrator role). As an example, FIG. 12 illustrates a GUI 1200 having another exemplary product data management view displayed therein. As shown in FIG. 12, GUI 1200 may include an answer composition section 1202, which may be configured to facilitate user entry of an answer to a question.

Answer composition section 1202 of GUI 1200 may include a question field 1204 displaying data representative of a question and an answer field 1206 configured to facilitate user entry of an answer to the question. In addition, GUI 1200 may include a workflow status selection tool 1208 configured to facilitate a user selection of a workflow status of a data entry associated with the question. In FIG. 12, the workflow status of the entry is set to a "to-be-answered" workflow status. After an author has input an answer to the question, the author may use the workflow status selection tool 1208 to set the workflow status of the entry to a "to-be-approved" workflow status. A user 130 assigned an approver role may use the workflow status selection tool 1208 to set the workflow status of the entry to a "final" workflow status. An approver may further use a publish tool 1210 in GUI 1200 to select to publish the entry. In response, product data management subsystem 110 may make the entry, or any information associated with the entry, accessible to one or more users 130 via one or more access devices 120, as described above.

GUI 1200 may also include a region selection tool 1212, which may be configured to facilitate a user selection of one or more geographic regions to be associated with the data entry corresponding to the question in question field 1204. Accordingly, a user 130 (e.g., a user 130 assigned an author role) may select geographic regions to which a question and answer are applicable. In FIG. 12, a selector 1214 indicates a user selection of a geographic region referred to as "US."

GUI 1200 may also include a keyword selection tool 1216 configured to facilitate user input of one or more keywords to be associated with the data entry. The keywords may be used to identify the data entry in searches of data store 315. The keyword selection tool 1216 may facilitate user input of keywords in any suitable way, including, without limitation, by typing one or more keywords into a text field or by selecting one or more keywords from a list of keywords displayed in GUI 1200 (e.g., a list of keywords associated with the product category and/or subcategory associated with the data entry).

GUI 1200 may also include a lifetime designation tool 1218 configured to facilitate a user designation of a lifetime to be associated with the data entry. In FIG. 12, the lifetime designation tool 1218 comprises a drop-down menu list of a plurality of user selectable lifetimes. As shown, each of the selectable lifetimes may specify a particular time period. The "default" option may be any predetermined time period as may suit a particular implementation. A user 130 may select one of the selectable lifetimes from the list. A lifetime for the data entry may be designated by a user 130 in any other suitable way in other embodiments.

In certain embodiments, product data management subsystem 110 may be configured to limit the selectable lifetimes to time periods that do not exceed a predetermined maximum lifetime (e.g., one year). This may help ensure that regular lifetime reviews are performed and product data 320 is kept up-to-date.

In response to a user designation of a lifetime for the data entry, product data management subsystem 110 may calculate a lifetime date for the data entry, as described above. The lifetime date may be displayed in GUI 1200 as indicated by reference number 1220. As described above, the lifetime date may be used by product data management subsystem 110 to trigger one or more operations, including, for example, automatically hiding a published data entry from user access and designating the data entry for a lifetime review (e.g., by automatically setting the workflow status of the data entry to an "out-of-date" workflow status as described above).

A user 130 may select a "save changes" button 1222 in GUI 1200 to cause product data management subsystem 110 to save and apply the user input provided in GUI 1200 to the corresponding data entry in data store 315.

FIG. 13 illustrates a GUI 1300 having another exemplary product data management view displayed therein. As shown in FIG. 13, GUI 1300 may include a quick statistics section 1302 associated with a user 130 accessing GUI 1300. Quick statistics section 1302 may include one or more entries associated with one or more data entry workflow statuses. In FIG. 13, the entries in quick statistics section 1302 are associated with "to-be-answered," "to-be-approved," "final-unpublished," "out-of-date," "near-expiration" (e.g., "expires soon"), and "recent-comment" (e.g., "new comments") workflow statuses. These particular workflow statuses are illustrative only. Other workflow statuses (e.g., a "final-published" workflow status) may be additionally or alternatively included in quick statistics section 1302.

Quick statistics section 1302 may further include a visual indication of a number of data entries in data store 315 that are associated with the user 130 accessing GUI 1300. The indication may include multiple separate indications separated by workflow status. In FIG. 13, the indication of data entries associated with the user 130 is separated into multiple indications, with an indication being associated with each entry in quick statistics section 1302. Hence, quick statistics section 1302 may include an indication of a workflow status and a number of data entries associated with the workflow status. For example, FIG. 13 shows an indication of a "to-be-answered" workflow status and an indication of a number (e.g., sixty-nine) of data entries associated with the user 130 accessing GUI 1300 and having a "to-be-answered" workflow status.

In certain embodiments, an indication of a number of data entries associated with a user 130 may comprise a link to a view of the corresponding data entries. Accordingly, the user 130 may select the link to access a view of corresponding data entries. For example, the user 130 may select an indication of a number of data entries associated with the user 130 and having an "out-of-date" workflow status. This may include the user 130 selecting a link indicated as number six-hundred-fifty-three in FIG. 13.

In response to this selection, a view of at least a subset of the data entries associated with the user 130 and having an "out-of-date" workflow status may be displayed in GUI 1300. FIG. 13 shows a data entries section 1304 including a list of data entries displayed therein. In the illustrated example, each displayed data entry in the list includes a display of a product category, a question, an answer, and a lifetime date associated with the data entry.

GUI 1300 may be configured to facilitate a lifetime review of one or more of the data entries displayed in section 1304. For example, the user 130 accessing GUI 1300 may visually consider the category, question, and answer associated with a data entry and displayed in section 1304. The user 130 may then select whether to renew the data entry based on this information. For example, the user 130 may elect to extend the lifetime of the data entry if the information included in the question and the answer is still accurate.

GUI 1300 may be configured to facilitate a renewal of a data entry. As shown in FIG. 13, for example, GUI 1300 may include a lifetime extension tool 1306 associated with each data entry in section 1304. Lifetime extension tool 1306 may be configured to facilitate a renewal of a data entry in any suitable way. In FIG. 13, lifetime extension tool 1306 comprises a display of a current lifetime expiration date associated with the corresponding data entry and a link to a drop-down menu list of a plurality of user selectable lifetime extensions. In response to a user selection of the link, the drop-down menu list of user selectable lifetime extensions may be displayed in GUI 1300. The drop-down menu list may be displayed in GUI 1300 as illustrated in FIG. 12 and described above. The user 130 accessing GUI 1300 may select one of the selectable lifetime extensions from the list. A renewal lifetime for the data entry may be designated by a user 130 in any other suitable way in other embodiments.

In response to a user designation of a renewal lifetime for the data entry, product data management subsystem 110 may calculate a new lifetime date for the data entry, as described above. The new lifetime date may be displayed in GUI 1300 as part of lifetime extension tool 1306. As described above, product data management subsystem 110 may perform one or more operations in response to a renewal of a data entry, including updating the lifetime date to a new lifetime date based on the renewal of the data entry. Product data management subsystem 110 may also update the workflow status of the data entry and republish the data entry for user access, as described above. The new lifetime date may be used by product data management subsystem 110 to trigger one or more operations, including, for example, automatically hiding a published data entry from user access and designating the data entry for another lifetime review (e.g., by automatically setting the workflow status of the data entry to an "out-of-date" workflow status as described above) in response to the new lifetime date being reached.

GUI 1300 may also include a data entry delete button 1308 associated with each data entry in section 1304. The user 130 accessing GUI 1300 may initiate a deletion of a data entry by selecting the corresponding data entry delete button 1308. For example, if during a lifetime review of an entry the user 130 determines that the information in the entry is no longer accurate, the user 130 may select the corresponding data entry delete button 1308. Product data management subsystem 110 may detect the selection and delete the data entry from data store 315.

GUI 1300 may also include a data entry edit button 1310 associated with each data entry in section 1304. The user 130 accessing GUI 1300 may initiate an editing session by selecting the corresponding data entry edit button 1310. For example, if during a lifetime review of an entry the user 130 determines that the information in the data entry is no longer accurate, the user 130 may select the corresponding data entry edit button 1310. Product data management subsystem 110 may detect the selection and open an editing session for the data entry (e.g., by providing an editing window in GUI 1300).

Information included in quick statistics section 1302 may be configured to function as a "to-do" list for a user 130. For example, a user 130 may look to quick statistics section 1302 to readily view a summary of data entries associated with one or more workflow statuses. Each workflow status may be associated with one or more functions that may be accessed by a user 130 by way of the quick statistics section 1302. As described above, for example, a user 130 may use quick statistics section 1302 to access a table of "out-of-date" data entries in order to perform lifetime reviews of the data entries. As another example, a user 130 may use quick statistics section 1302 to access a table of "to-be-answered" data entries in order to provide answers to questions associated with the data entries. As yet another example, a user 130 may use quick statistics section 1302 to access a table of "to-be-approved" data entries in order to approve the data entries for publishing.

As shown in FIG. 13, GUI 1300 may include a time-to-answer statistics section 1312, which may display information associated with the user 130 accessing GUI 1300. In the illustrated example, the time-to-answer statistics section 1312 includes data representing an average time-to-answer for the user 130 for product categories associated with the user 130 and for all product categories. As shown, in one example the average time-to-answer for categories associated with the user 130 is 0.39 days and the average time-to-answer for all categories is 1.61 days. The time-to-answer data displayed in the time-to-answer statistics section 1312 may be obtained and/or calculated in any of the ways described above.

Product data management subsystem 110 may be configured to provide data representative of other statistics and/or related data 345 to one or more access devices 120 for display in one or more GUIs. The statistics and/or related data 345 may be specific to data entries associated with a user, user group, product category, or other grouping of data entries.

FIG. 14 illustrates a GUI 1400 having another exemplary product data management view displayed therein. As shown in FIG. 14, GUI 1400 may include a user section 1402 displaying information and/or options specific to a user 130 accessing GUI 1400. In the illustrated example, GUI 1400 includes a plurality of selectable menu tabs 1404. When a "user statistics" menu tab is selected, user statistics for the user 130 may be displayed in user section 1402. As shown in FIG. 14, examples of user statistics may include a list 1406 of one or more product categories associated with the user 130. For each category, user statistics may be displayed, including, for example, a number of questions asked and answered, one or more time-to-answer statistics, and percentages of the number of questions answered within certain timeframes (e.g., within twenty-four hours, within seventy-two hours, within five days, and over five days). A summation of the statistics across all of the categories associated with the user 130 may also be displayed.

Alternatively or additionally, GUI 1400 may include category statistics for product categories associated with the user 130. As shown in FIG. 14, examples of category statistics may include a list 1408 of one or more product categories associated with the user 130. For each category, category statistics may be displayed, including, for example, a number of data entries published for user access (e.g., a number of data entries having a "final-published" workflow status), a number of data entries having a "to-be-answered" workflow status, a number of data entries having a "to-be-approved" workflow status, a number of data entries having a "final-unpublished" workflow status, a number of data entries having an "out-of-date" workflow status, a number of data entries having a lifetime that is expiring (e.g., scheduled to expire) within a certain time (e.g., fourteen days), and a number of data entries in which new comments have been received within a certain time (e.g., within the last fourteen days). A summation of these category statistics across all of the categories associated with the user 130 may also be displayed.

Any of the statistical information displayed in GUI 1400 may comprise a link to additional information (e.g., to one or more corresponding data entries). For example, statistical data displayed within the category statistics may comprise a link configured to launch a view of one or more data entries corresponding to a specific workflow status. In the illustrated example, for instance, a user 130 may click on a link 1410 to access a view of data entries associated with a "US Internet Dedicated—Managed" product category and having a "to-be-answered" workflow status.

As another example, any of the statistical data displayed within the user statistics may comprise a link configured to launch a view of detailed statistics organized by keywords associated with data entries. In the illustrated example, for instance, a user 130 may click on a link 1412 to access a view of detailed statistics organized by keywords.

Figure 15:
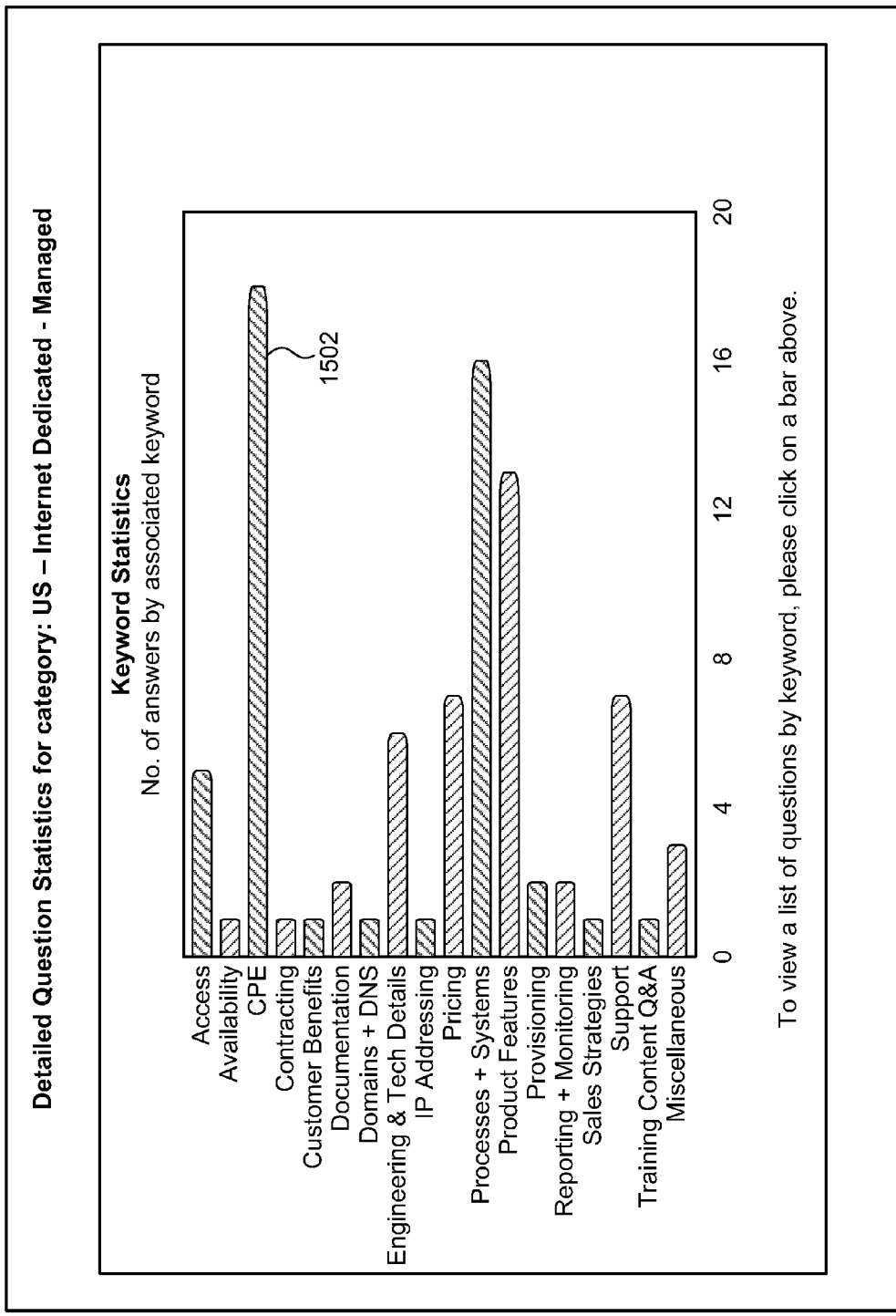

FIG. 15 illustrates a GUI 1500 having another exemplary product data management view displayed therein. In certain examples, GUI 1500 of FIG. 15 may be displayed in response to a user selection of link 1412 in FIG. 14. As shown in FIG. 15, GUI 1500 may include a display of keyword statistics. In the illustrated example, the keyword statistics comprise data representative (e.g., a bar graph) of a number of answered questions for each of a plurality of keywords within a product category. For a keyword called "CPE" within a product category called "US—Internet Dedicated—Managed," for example, there are eighteen answered questions, as represented by a bar 1502 in FIG. 15.

In certain embodiments, any of the keyword statistics displayed in GUI 1500 may comprise a link to additional information (e.g., to one or more data entries corresponding to the questions and answers represented by the data). For example, bar 1502 may comprise a link to a view of one or more data entries corresponding to questions and answers associated with the "CPE" keyword within the "US—Internet Dedicated—Managed" product category. Hence, a user 130 may select bar 1502 to access a view of data entries associated with the corresponding keyword.

The statistics described above are illustrative only. Other statistics may be additionally or alternatively tracked, calculated, and/or provided by product data management subsystem 110 in other embodiments. For example, region statistics for specific geographic regions may be provided, including, without limitation, a number of data entries, questions, and/or answers for a region associated with a user 130. As another example, a number of data entries, questions, and/or answers associated with a user 130 may be broken down by region (e.g., percentage of the questions associated with different regions) and provided for display in one or more GUIs.

Returning to FIG. 14, a user 130 may select another of the plurality of selectable menu tabs 1404. When a "user subscriptions" menu tab is selected, subscription information for the user 130 may be displayed in user section 1402.

Figure 16:
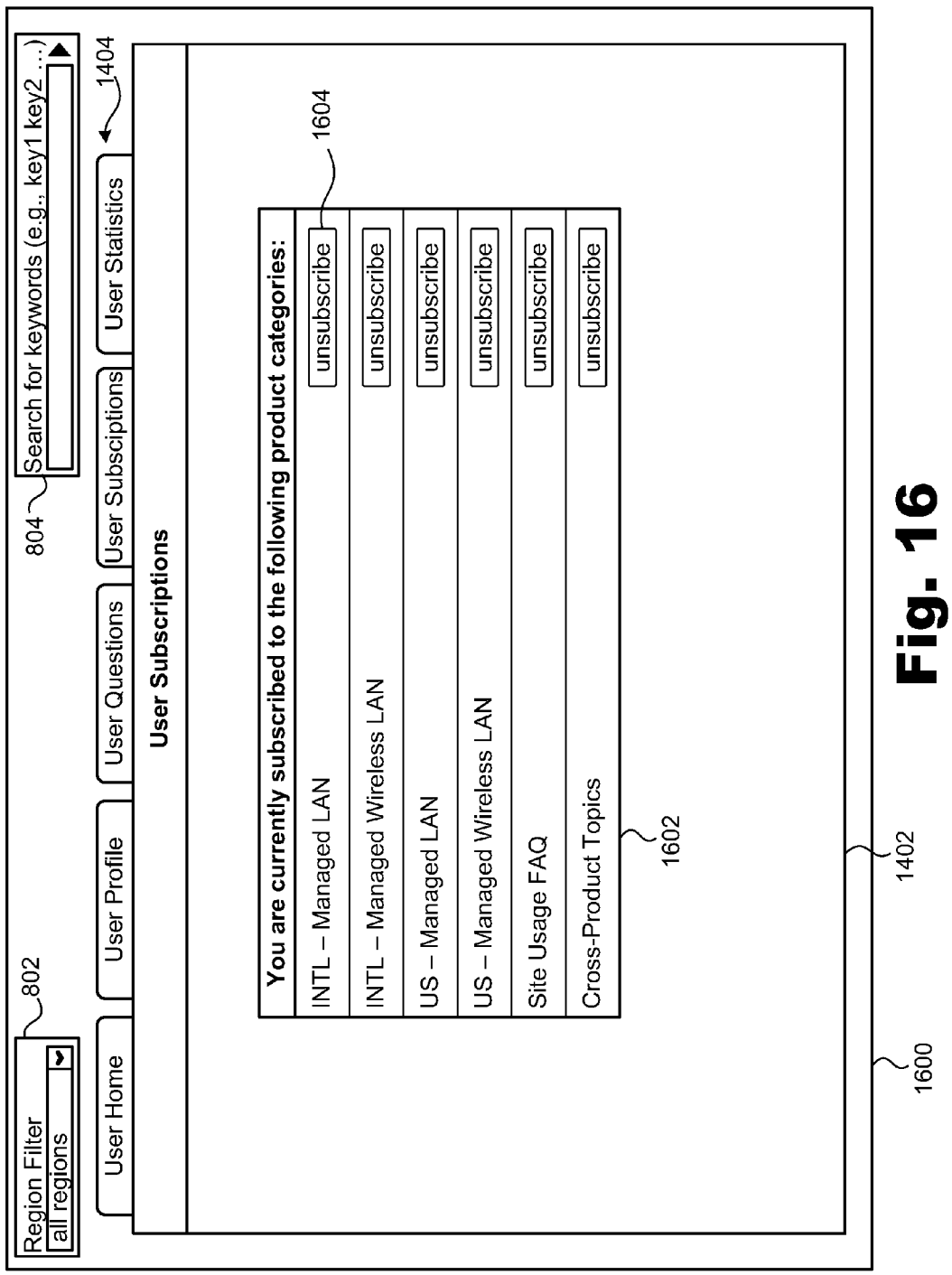

FIG. 16 illustrates a GUI 1600 having another exemplary product data management view displayed therein. As shown in FIG. 16, GUI 1600 may include user section 1402, which may include a display of subscription information for the user 130 accessing GUI 1600. The subscription information may include a subscription section 1602 having a list of product categories to which the user 130 is currently subscribed.

GUI 1600 may also provide one or more tools configured to facilitate the user 130 managing the subscriptions. For example, as shown in FIG. 16, each of the product categories to which the user 130 is subscribed may include an "unsubscribe" button, such as "unsubscribe" button 1604. When the user 130 selects "unsubscribe" button 1604, product data management subsystem 110 may respond by automatically terminating the subscription to the product category called "INTL—Managed LAN."

The user 130 may select any of the other selectable menu tabs 1404 shown in FIG. 16. In response to a user selection of a "user questions" menu tab, product data management subsystem 110 may provide information about product questions associated with the user 130 (e.g., a list of questions asked by the user 130) for display in user section 1402 of GUI 1600. In response to a user selection of a "user profile" menu tab, product data management subsystem 110 may provide information about a user profile (e.g., user settings, preferences, etc associated with the user 130) for display in user section 1402 of GUI 1600. In response to a user selection of a "user home" menu tab, product data management subsystem 110 may provide a user home page associated with the user 130 for display in user section 1402 of GUI 1600.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   maintaining product data in a computer-readable data store, the product data including a data entry comprising a question about a product;
   setting a lifetime date for the data entry;
   receiving data representative of an answer to the question authored by an author and at least one keyword designated by the author and associated by the author with the answer;
   providing data representative of the question and the answer for consideration by an approver;
   receiving data representative of an approval of the question and the answer, the approval having been provided by the approver;
   publishing the question and the answer about the product for access by at least one user in response to the approval; and
   in response to the lifetime date being reached, automatically hiding the question and the answer about the product from access by the at least one user and designating the data entry for a lifetime review, the lifetime review including determining whether the hidden question and the hidden answer about the product are out-of-date.

2. The method of claim 1, wherein the setting of the lifetime date for the data entry comprises:
   providing, for display, data representative of a graphical user interface configured to facilitate user designation of a lifetime for the data entry;
   receiving data representative of the user designation of the lifetime for the data entry; and
   setting the lifetime date for the data entry based on the data representative of the user designation of the lifetime for the data entry.

3. The method of claim 2, further comprising providing data representative of a plurality of selectable lifetimes for display in the graphical user interface, wherein the user designation of the lifetime for the data entry comprises a user selection of one of the selectable lifetimes from the plurality of selectable lifetimes.

4. The method of claim 1, wherein the setting of the lifetime date for the data entry comprises setting the lifetime date for the data entry based on a predetermined default lifetime.

5. The method of claim 1,
   wherein the data representative of the question is received from an access device;
   the method further comprising:
   determining a product category associated with the question; and
   after the product category is determined, providing the data representative of the question for consideration by the author, the author associated with the product category.

6. The method of claim 5, further comprising:
   automatically determining a length of time taken to provide the answer to the question;
   utilizing the length of time to calculate a time-to-answer statistic; and
   publishing the time-to-answer statistic for user access.

7. The method of claim 6, wherein the time-to-answer statistic comprises an average time-to-answer for the author over a period of time.

8. The method of claim 5, further comprising:
   associating the at least one keyword with the data entry for subsequent use in identifying the data entry.

9. The method of claim 5, further comprising:
   setting a workflow status for the data entry to a to-be-answered status in response to the receiving of the data representative of the question;
   transitioning the workflow status for the data entry from the to-be answered status to a to-be-approved status in response to the receiving of the data representative of the answer;
   transitioning the workflow status for the data entry from the to-be-approved status to a final-published status in response to the receiving of the data representative of the approval of the question and the answer; and transitioning the workflow status for the data entry from the final-published status to an out-of-date status in response to the lifetime date for the data entry being reached.

10. The method of claim 9, further comprising:
providing, for display, data representative of a graphical user interface configured to facilitate the lifetime review of the data entry by a user;
receiving data representative of a renewal of the data entry; and
updating the lifetime date for the data entry based on the data representative of the renewal of the data entry.

11. The method of claim 10, further comprising:
transitioning the workflow status for the data entry from the out-of-date status back to the final-published status in response to the renewal of the data entry; and
republishing the question and the answer about the product for access by the at least one user.

12. The method of claim 10, wherein the graphical user interface comprises a plurality of user selectable lifetime extensions for the data entry.

13. The method of claim 1, tangibly embodied as computer-executable instructions on at least one computer-readable medium, the computer-executable instructions configured to direct at least one processor to perform at least one of the maintaining, the setting, the publishing, the hiding, and the designating.

14. A system comprising:
a processing module including at least one processor; and
a product information management module in communication with the processing module and configured to direct the at least one processor to:
maintain product data in a data store, the product data including a data entry comprising a question about a product,
set a lifetime date for the data entry,
receive data representative of an answer to the question authored by an author and at least one keyword designated by the author and associated by the author with the answer;
provide data representative of the question and the answer for consideration by an approver;
receive data representative of an approval of the question and the answer, the approval having been provided by the approver;
publish the question and the answer about the product for access by at least one user in response to the approval,
in response to the lifetime date being reached, automatically hide the question and the answer about the product from access by the at least one user and designate the data entry for a lifetime review, the lifetime review including determining whether the hidden question and the hidden answer about the product are out-of-date.

15. The system of claim 14, wherein the product information management module is configured to direct the at least one processor to set the lifetime date for the data entry by:
providing, for display, data representative of a graphical user interface configured to facilitate a user designation of a lifetime for the data entry;
receiving data representative of the user designation of the lifetime for the data entry; and
setting the lifetime date for the data entry based on the data representative of the user designation of the lifetime for the data entry.

16. The system of claim 15, wherein the product information management module is further configured to direct the at least one processor to provide data representative of a plurality of selectable lifetimes for display in the graphical user interface, wherein the user designation of the lifetime for the data entry comprises a user selection of one of the selectable lifetimes from the plurality of selectable lifetimes.

17. The system of claim 14, wherein the product information management module is configured to direct the at least one processor to:
receive the data representative of the question from an access device;
determine a product category associated with the question; and
after the product category is determined, provide the data representative of the question for consideration by the author, the author associated with the product category.

18. The system of claim 17, wherein the product information management module is configured to direct the at least one processor to:
automatically determine a length of time taken to provide the answer to the question;
utilize the length of time to calculate a time-to-answer statistic; and
publish the time-to-answer statistic for user access.

19. The system of claim 17, wherein the product information management module is configured to direct the at least one processor to:
set a workflow status for the data entry to a to-be-answered status in response to the receipt of the data representative of the question;
transition the workflow status for the data entry from the to-be answered status to a to-be-approved status in response to the receipt of the data representative of the answer;
transition the workflow status for the data entry from the to-be-approved status to a final-published status in response to the receipt of the data representative of the approval of the question and the answer; and
transition the workflow status for the data entry from the final-published status to an out-of-date status in response to the lifetime date for the data entry being reached.

20. The system of claim 14, wherein the product information management module is configured to direct the at least one processor to:
provide, for display, data representative of a graphical user interface configured to facilitate the lifetime review of the data entry by a use;
receive data representative of a renewal of the data entry; and
update the lifetime date for the data entry based on the data representative of the renewal of the data entry.

21. The system of claim 20, wherein the graphical user interface comprises a plurality of user selectable lifetime extensions for the data entry.

22. The method of claim 1, wherein the lifetime review further comprises determining whether the product has been changed since the question or the answer was published.

23. The method of claim 1, wherein the publishing of the question and the answer about the product for access by the at least one user further comprises categorizing the question and the answer about the product into a product category related to the product based on one or more keywords in the question about the product.

24. The method of claim 1, wherein the at least one user is assigned a regular user role that provides the at least one user with access to the question and the answer when the question and the answer are published but not when the question and the answer are hidden.

25. The method of claim 24, wherein the automatically hiding of the question and the answer comprises hiding the question and the answer from access by the at least one user assigned the regular user role and not hiding the question and the answer from access by at least one other user assigned a role different from the regular user role.

26. The method of claim 1, wherein the determining whether the hidden question and the hidden answer about the product are out-of-date comprises determining whether the product has changed since the question or the answer was received.

* * * * *